United States Patent
Jones et al.

(10) Patent No.: US 11,640,637 B2
(45) Date of Patent: May 2, 2023

(54) SYSTEMS AND METHODS FOR GEO MAPPING

(71) Applicant: Intercontinental Exchange Holdings, Inc., Atlanta, GA (US)

(72) Inventors: Richard Jones, Tarrytown, NY (US); Vincent Procacci, New York, NY (US); Spencer Gallagher, Pennington, NJ (US); Caroline Tom, Brooklyn, NY (US); Ralph Harary, Sudbury, MA (US)

(73) Assignee: Intercontinental Exchange Holdings, Inc., Atlanta, GA (US)

(*) Notice: Subject to any disclaimer, the term of this patent is extended or adjusted under 35 U.S.C. 154(b) by 0 days.

(21) Appl. No.: 17/583,920

(22) Filed: Jan. 25, 2022

(65) Prior Publication Data

US 2022/0148080 A1 May 12, 2022

Related U.S. Application Data

(60) Provisional application No. 63/161,711, filed on Mar. 16, 2021.

(51) Int. Cl.
*G06Q 40/02* (2012.01)

(52) U.S. Cl.
CPC .................. *G06Q 40/025* (2013.01)

(58) Field of Classification Search
None
See application file for complete search history.

(56) References Cited

U.S. PATENT DOCUMENTS

| | | | | |
|---|---|---|---|---|
| 7,595,725 | B1* | 9/2009 | Joseph | G06Q 30/02 340/539.2 |
| 8,812,482 | B1* | 8/2014 | Kapoor | G06F 16/273 707/706 |
| 2005/0096849 | A1* | 5/2005 | Sorrells | G06Q 30/02 702/19 |
| 2011/0320433 | A1* | 12/2011 | Mohiuddin | G06F 16/24535 707/E17.054 |

(Continued)

OTHER PUBLICATIONS

C. Zhang, W. Li, M. J. Day & Z-R Peng (2003) GML-Based Interoperable Geographical Databases, Cartography, 32:2, 1-16. 2011. (Year: 2003).*

*Primary Examiner* — Abdulmajeed Aziz
(74) *Attorney, Agent, or Firm* — DLA Piper LLP (US)

(57) ABSTRACT

Geographical mapping and linking of security and risk indicator data. Cross-references are created between location indicators and geo-spatial areas based on a statistical algorithm, in accordance with geo-spatial data. The cross-references are stored in a first data table. A credit risk indicator (CRI) is generated for each geo-spatial area based on other data, forming CRI data that is stored in second data table. A security associated with one of the location indicators is identified among security data. A first link is created between the security and a geo-spatial area based on the cross-references in the first data table. Based on the first link, a second link is created between an indicator among the CRI data in the second data table and the security. The second link is used to form instrument-level data for the security that includes the indicator. The instrument-level data is stored in a third data table.

20 Claims, 19 Drawing Sheets

(56) References Cited

U.S. PATENT DOCUMENTS

| | | | |
|---|---|---|---|
| 2014/0310162 A1* | 10/2014 | Collins | G06Q 40/08 707/769 |
| 2018/0314705 A1* | 11/2018 | Griffith | G06F 16/185 |
| 2020/0294128 A1* | 9/2020 | Cella | H04L 9/0637 |
| 2021/0034598 A1* | 2/2021 | Arye | G06F 16/288 |
| 2021/0149927 A1* | 5/2021 | Coorey | G06Q 50/26 |

* cited by examiner

| INSTRUMENT ID | ISSUER | ISSUE | OBLIGOR | GEO ORG | GEO_TYPE | ZIPCODE |
|---|---|---|---|---|---|---|
| 3404938 | ALBANY N Y HSG AUTH | REV BDS | MCCARTHY HSG DEVELOPMENT FUND CO INC | OBLIGOR | CITY | 12202 |
| 192545034 | ACKLEY IOWA | REF BDS | PRESBYTERIAN VILLAGE | OBLIGOR | CITY | 50601 |
| 170069048 | MASSACHUSETTS ST DEV FIN AGY | BDS | EMERSON COLLEGE | ISSUE | STATE | 02116 |
| 7470636 | NEW YORK ST DORM AUTH | REV BDS | CULINARY INSTITUTE OF AMERICA | ISSUE | STATE | 12538 |
| 140892367 | CALIFORNIA MUN FIN AUTH | REV BDS | EMERSON COLLEGE | ISSUE | STATE | 90028 |
| 105832580 | CALIFORNIA STATEWIDE CMNTYS DEV AUTH | REV BDS | CULINARY INSTITUTE OF AMERICA | ISSUE | STATE | 94574 |
| 343987447 | BIRMINGHAM ALA | TAXABLE GO WTS | N/A | ISSUER | CITY | 35203 |
| 327559953 | ANCHORAGE ALASKA | GO PURP REF BDS | N/A | ISSUER | CITY | 99501 |

FIG. 8A

| INSTRUMENT ID | ISSUER | GEO_MULTI_TYPE | GEO_TYPE | ZIPCODE |
|---|---|---|---|---|
| 67146871 | DEKALB & CHEROKEE CNTYS ALA GAS DIST | DEKALB CNTY ALA | COUNTY | 35967 |
| | | CHEROKEE CNTY ALA | COUNTY | 35959 |

FIG. 8B

| INSTRUMENT ID | ISSUER | ISSUE | OBLIGOR | 2019 CENSUS BUREAU POPULATION ESTIMATE |
|---|---|---|---|---|
| 67146870 | DEKALB & CHEROKEE CNTYS ALA GAS DIST | REV BDS 2015A | | 97,709 |
| 67146871 | DEKALB & CHEROKEE CNTYS ALA GAS DIST | REV BDS 2015A | | 97,709 |
| 4894539 | CHEROKEE CNTY ALA | REF WTS 2003 A | | 26,196 |
| 4894540 | CHEROKEE CNTY ALA | REF WTS 2003 A | | 26,196 |
| 3416293 | CHEROKEE CNTY ALA | REV BDS | | 26,196 |

FIG. 9

| Issue | Maturity | Put/Var Rate | FRN | Refund/Escrow | Ratings | Default | Issue Ratings | Call | Special Call | Sink | Sink Mult | Part Redemption |
|---|---|---|---|---|---|---|---|---|---|---|---|---|

Issue 1180743    NY    NEW YORK NY

| INST ID | Ser | Mat Date | | Term Serial Ind | | Prin Amt | Maturity Amt | | Coupon Rate | | Orig Price | Orig Yield |
|---|---|---|---|---|---|---|---|---|---|---|---|---|
| 649662703 | 1 | 08/01/2022 | | S | | 20,790,000.00 | 20,790,000.00 | | | | 108.197 | 0.41 |
| 649662710 | 1 | 08/01/2023 | | S | | 21,830,000.00 | 21,830,000.00 | | | 5 | 112.352 | 0.54 |
| 649662728 | 1 | 08/01/2024 | | S | | 26,010,000.00 | 26,010,000.00 | | | 5 | 116.358 | 0.63 |
| 649662736 | 1 | 08/01/2025 | | S | | 27,310,000.00 | 27,310,000.00 | | | 5 | 119.872 | 0.77 |
| 649662744 | 1 | 08/01/2026 | | S | | 28,675,000.00 | 28,675,000.00 | | | 5 | 122.779 | 0.95 |
| 649662759 | 1 | 08/01/2027 | | S | | 30,110,000.00 | 30,110,000.00 | | | 5 | 125.017 | 1.16 |
| 649662767 | 1 | 08/01/2028 | | S | | 31,615,000.00 | 31,615,000.00 | | | 5 | 127.000 | 1.34 |
| 649662775 | 1 | 08/01/2029 | | S | | 33,195,000.00 | 33,195,000.00 | | | 5 | 128.354 | 1.54 |
| 649662783 | 1 | 08/01/2030 | | S | | 34,855,000.00 | 34,855,000.00 | | | 5 | 129.970 | 1.67 |
| 649662791 | 1 | 08/01/2031 | | S | | 36,595,000.00 | 36,595,000.00 | | | 5 | 128.925 | 1.77 |
| 649663708 | 1 | 08/01/2032 | | S | | 38,425,000.00 | 38,425,000.00 | | | 5 | 127.891 | 1.87 |
| 649663716 | 1 | 08/01/2033 | | S | | 40,350,000.00 | 40,350,000.00 | | | 5 | 127.071 | 1.95 |
| 649663724 | 1 | 08/01/2034 | | S | | 42,365,000.00 | 42,365,000.00 | | | 5 | 126.459 | 2.01 |
| 649663732 | 1 | 08/01/2035 | | S | | 44,485,000.00 | 44,485,000.00 | | | 5 | 125.851 | 2.07 |
| 649663740 | 1 | 08/01/2036 | | S | | 46,710,000.00 | 46,710,000.00 | | | 4 | 114.924 | 2.29 |
| 649663757 | 1 | 08/01/2037 | | S | | 48,570,000.00 | 48,570,000.00 | | | 4 | 114.358 | 2.35 |
| 649663861 | 1 | 08/01/2038 | | S | | 50,515,000.00 | 50,515,000.00 | | | 5 | 124.347 | 2.22 |
| 649663879 | 1 | 08/01/2039 | | S | | 53,045,000.00 | 53,045,000.00 | | | 4 | 113.514 | 2.44 |

[Figure showing user interface 1000 with tabs: Corp Name, Issuer, Issuer Legal, Obligor Name, Reports (1024). Fields include Inst ID (1026), Issuer Key: 25286, Issuer Name (1028). A "Listing of Issuer (Records 1 of 70)" dialog box (1030) displays a table with columns Inst ID, Issuer Key, State, Long Name (1032):

| Inst ID | Issuer Key | State | Long Name |
|---------|------------|-------|-----------|
| 64966 | 25286 | NY | NEW YORK N Y |
| 649660 | 25286 | NY | NEW YORK N Y |
| 649661 | 25286 | NY | NEW YORK N Y |
| 649662 | 25286 | NY | NEW YORK N Y |
| 649663 | 25286 | NY | NEW YORK N Y |
| 649664 | 25286 | NY | NEW YORK N Y |
| 649665 | 25286 | NY | NEW YORK N Y |
| 649666 | 25286 | NY | NEW YORK N Y |
| 649667 | 25286 | NY | NEW YORK N Y |
| 649668 | 25286 | NY | NEW YORK N Y |
| 649669 | 25286 | NY | NEW YORK N Y |
| 6496610 | 25286 | NY | NEW YORK N Y |
| 6496611 | 25286 | NY | NEW YORK N Y |
| 6496612 | 25286 | NY | NEW YORK N Y |

With OK and CANCEL buttons (1034). Left side form fields: Inst ID, Issuer Key, Issuer Name, Issuer Legal, SE Long Nam, Inst ID Type, State, Issuer Alt Sta, State GO, Last Upd. By, Last Upd. Dt, Isr Key Upd D, Isr Name Upd, State Upd Dt, Institution Sul, IDENTIFIER City, IDENTIFIER State, Inst Sub ID, Reporting Entity Name. Bottom fields: Fitch, Other Tax Exempt, OTE Upd Dt. Labels 1020, 1022.]

FIG. 10E

| Corp Name | Issuer | Issuer Legal | Obligor Name | Reports |

IDENTIFIER: NAME:

Key: 117701

Corp Key:
IDENTIFIER: 117701
Corp Name: QUEENS BALLPARK CO LLC

SE Corp Name:

Inst Sub ID:
Contact:
Address1:
Address2:
City:
State: Zip: 11368
Phone: Fax:

Corp Geo Type: MSA - METROPOLITAN
Corp Geo Sub Type:
Corp Geo Multi Type:

FIG. 10F

| Corp Name | Issuer | Issuer Legal | Obligor Name | Reports |

Key: [ ]
IDENTIFIER: [ ] NAME: [ ] ☐ Inactive

Obligor Key: 268170
IDENTIFIER: 005585
Inst Sub ID:
Obligor Name: PHS APPLE VY SR MSG INC
Address1:
Address2:
City:
State: MN  MINNESOTA ▼  Zip: 55113
Contact:                      Fax:
Phone:

Show Matches

Obligor Geo Type: ▼
Obligor Geo Sub Type: ▼
Obligor Geo Multi Type: MSA - METROPOLITAN ▼

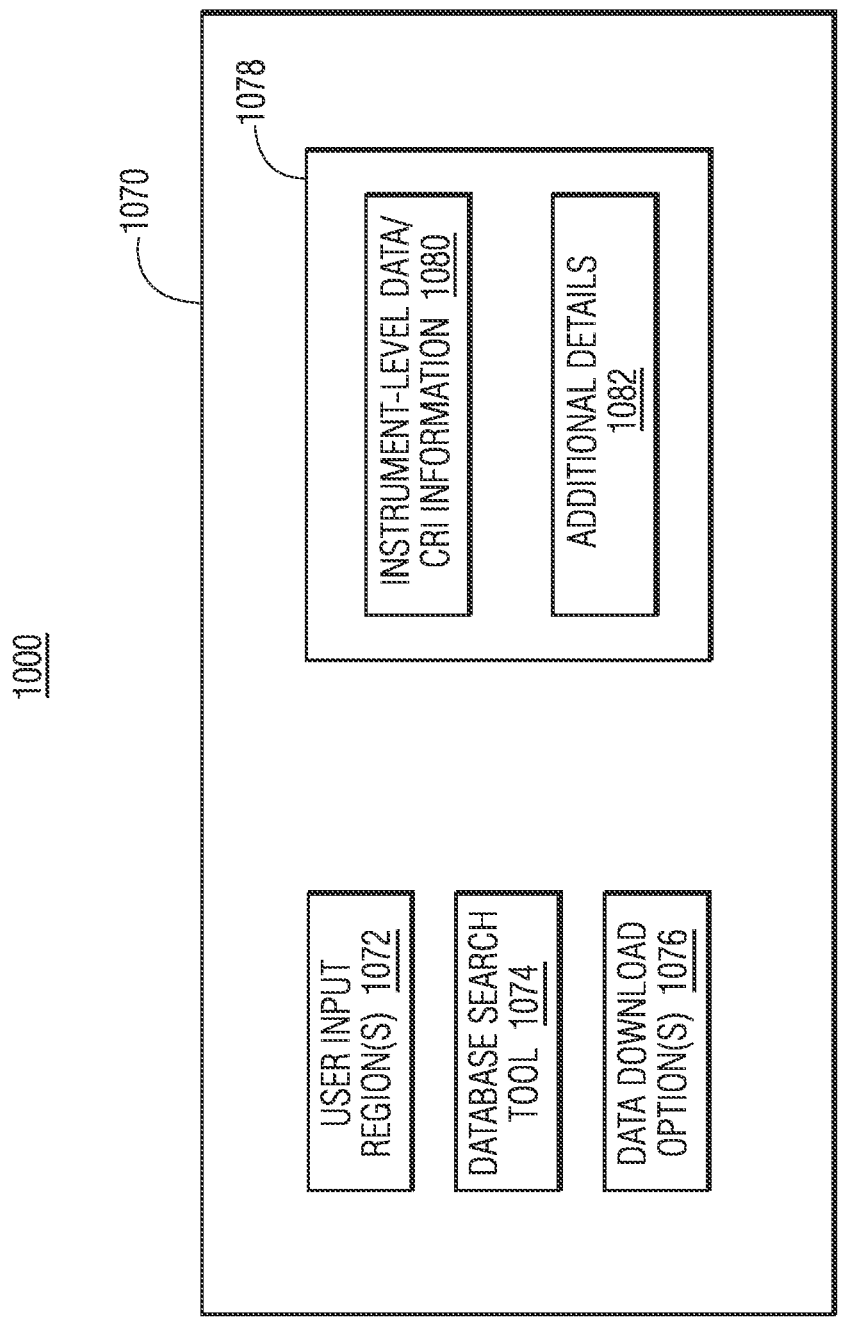

SYSTEMS AND METHODS FOR GEO MAPPING

TECHNICAL FIELD

The present disclosure relates generally to improving data structure integration and distribution and, more particularly, to systems and methods for the geographical mapping and linking of disparate data structures for interaction.

BACKGROUND

Problems exist in the field of digital distribution platforms. In general, a digital distribution platform may manage digital data content and distribute the content to various end-users. Conventional platforms may distribute digital data content from one or more sources (e.g., data feeds, data files, user input and the like). The data to be distributed may include different data types, different data communications requirements and the like. In addition, distribution platforms may distribute data content in one or more distribution formats (e.g., in a data file, on a user interface, in a spreadsheet, etc.) to particular end-users. Conventional platforms also exist that may provide the ability for user-interaction with the distributed data. All of the above variables associated with data distribution make it technically difficult to manage data distribution and interaction, including for real-time distribution. Moreover, distribution of digital data content (including in real-time) becomes increasing difficult as the volume of digital data content to be distributed increases and/or as the digital data content changes more rapidly over time (e.g., with increasing volatility of the data content).

Another significant technical problem that exists in data distribution platforms includes the integration of data content for distribution that includes disparate data types. While it may be possible, for example, to display disparate data types side-by-side on a user interface, it may be difficult to integrate disparate data types in an intelligent manner, so that the integration provides meaningful information about the combination of disparate data types. For example, it may be difficult to discover any significant relationships between first and second data types, simply by examining the first and second data types. It may also be difficult to identify data (e.g., existing data, new data) that may be relevant to one of the data types, without knowledge of such a relationship. Without the identification of suitable data, any attempted may provide an incomplete and/or incorrect integration results. Thus, it may be technically difficult to suitably identify relevant data and integrate disparate data types.

Accordingly, there is a need for a system and method for integrating and distributing disparate data types in a fully automated (or near fully-automated) manner. All of this, without significant increases to the computational burden, cost, system complexity, re-programming requirements and system maintenance.

SUMMARY

Aspects of the present disclosure relate to systems, methods and non-transitory computer-readable media providing geographical mapping and linking of security and credit risk data. A system includes one or more data source systems configured to generate geo-spatial data, security data and other data. The system further includes at least one server in communication with the one or more data source systems. The at least one server is configured to obtain the geo-spatial data, the security data and the other data from among the one or more data source systems. The at least one server is further configured to create one or more cross-references between one or more location indicators and one or more geo-spatial areas based on at least one statistical algorithm, in accordance with the geo-spatial data among the one or more data source systems, and store the created cross-references in at least one first data table. The at least one server is further configured to generate, for each of the one or more geo-spatial areas, at least one credit risk indicator based on the other data among the one or more data source systems, to form credit risk indicator data and store the credit risk indicator data in at least one second data table. The at least one server is further configured to identify at least one security of the security data among the one or more data source systems. The at least one security is associated with at least one among the one or more location indicators. The at least one server is further configured to create a first link between the at least one security and at least one among the one or more geo-spatial areas based on the created cross-references in the at least one first data table and create a second link between at least one indicator among the credit risk indicator data in the at least one second data table and the at least one security based on the first link, to form instrument-level data for the at least one security including the at least one indicator. The at least one server is further configured to store the instrument-level data for the at least one security in at least one third data table.

BRIEF DESCRIPTION OF THE DRAWINGS

FIG. 8A is a table illustrating example instrument-level information of various municipal bonds linked to geo-spatial areas, according to an aspect of the present disclosure.

FIG. 8B is a table illustrating an instrument linked to two geo-spatial areas, according to an aspect of the present disclosure.

FIG. 9 is an example data table storing instrument-level information linked to credit risk information, according to an aspect of the present disclosure.

FIGS. 10A, 10B, 10C, 10D, 10E, 10F and 10G are screenshots of an example security geo mapping graphical user interface (GUI), according to an aspect of the present disclosure.

DETAILED DESCRIPTION

Figure 1:
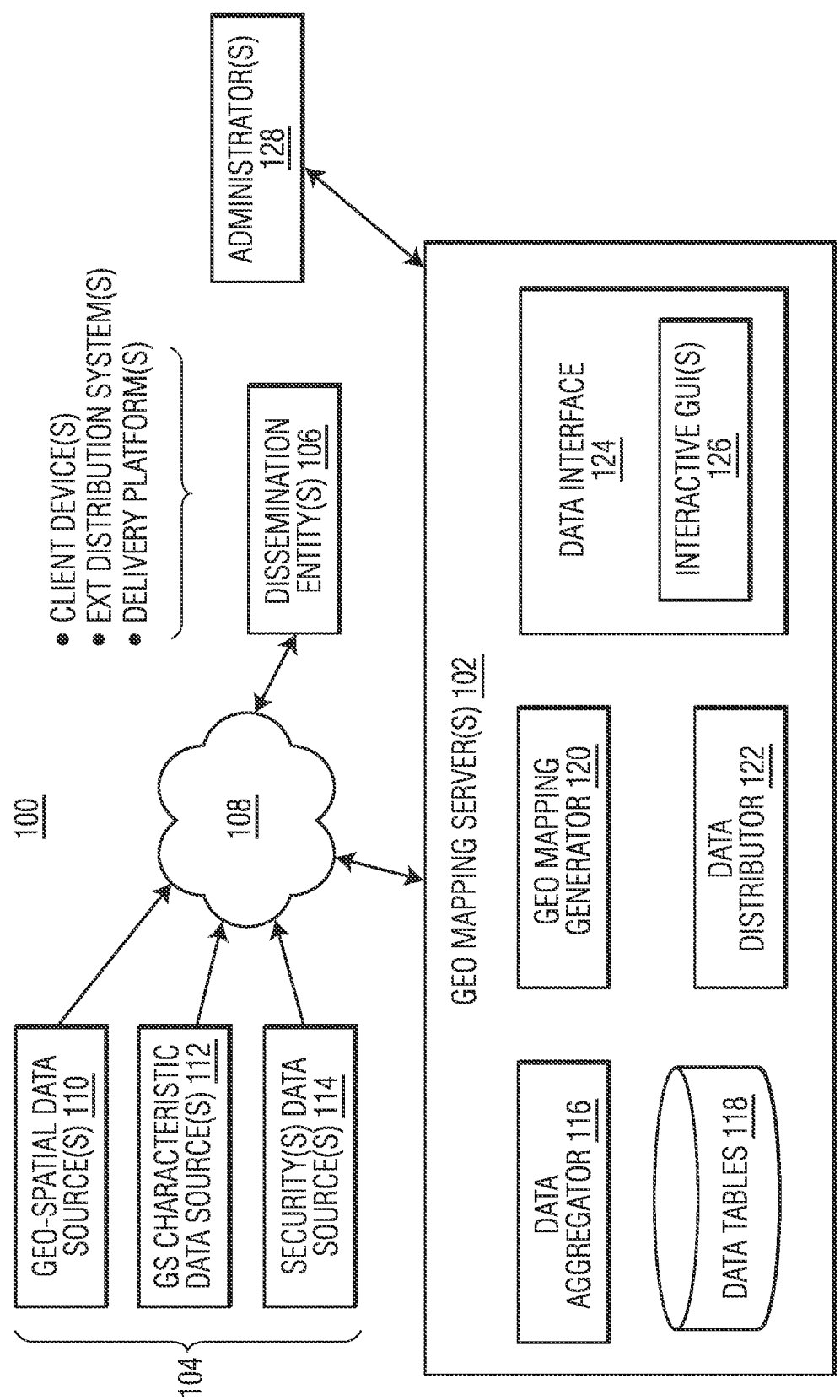
FIG. 1 is a functional block diagram of an example geographical mapping and distribution system, according to an aspect of the present disclosure.

The present disclosure is related to a geographical mapping ("geo mapping" herein) system that may create one or more geo-spatial links between one or more securities (e.g., financial instrument(s) in the municipal finance market) and other information that may be sourced and indexed by location. The geo mapping system may also generate one or more credit risk indicators for securities such as municipal securities based on the geo-spatial link(s). The credit risk indicator(s) may be provided to one or more client devices via at least one distribution component. In some examples, the credit risk indicator(s) may provide users of possible credit risk for at least one particular municipal security based on the geo-spatial link(s). In the description herein, municipal securities are also referred to as munis, and securities are also referred to (in some examples) as instruments.

In some examples, aspects of the present disclosure relate to systems and methods for geo mapping and linking of security and credit risk data. In some examples, a system may include one or more data systems and at least one server in communication with the data source system(s). The data source system(s) may be configured to generate geo-spatial data, security data and other data. The server(s) may be configured to obtain the geo-spatial data, the security data and the other data from among the data source system(s), create one or more cross-references between one or more location indicators and one or more geo-spatial areas based on at least one statistical algorithm, in accordance with the geo-spatial data among the data source system(s), and store the created cross-references in at least one first data table. The server(s) may also be configured to generate, for each geo-spatial area, at least one credit risk indicator based on the other data among the data source system(s), to form credit risk indicator data. The credit risk indicator data may be stored in at least one second data table. The server(s) may also be configured to identify at least one security of the security data among the data source system(s). The security(s) may be associated with at least one among the location indicator(s). A first link may be created between the security(s) and at least one among the geo-spatial area(s) based on the created cross-references in the first data table(s). Based on the first link, a second link may be created between at least one indicator among the credit risk indicator data (in the at least one second data table) and the security(s), to form instrument-level data for the security(s) that includes the indicator(s). The instrument-level data for the security(s) may be stored in at least one third data table. In some examples, the instrument-level data may be distributed to one or more distribution entities.

The geo mapping system of the present disclosure solves the problem of linking available and broadly known data such as demographic or economic data and assigning this data directly to a security that shares a same geo-spatial profile. Such a linkage does not exist other than the geo mapping system of the present disclosure. Indeed, conventional systems do not consider such geo-spatial data and thus do not provide the credit risk indicators associated with the linked geo-spatial data of the present disclosure. Non-limiting examples of credit risk indicator(s) may include data associated with one or more of population, income, migration, labor statistics, housing, education, healthcare, etc. In general, the credit risk indicator(s) may be associated with any data (e.g., population, income, etc.) that may impact a particular security. In general, municipal securities represent debt securities issued by (for example) states, cities, counties and other governmental entities to fund day-to-day obligations and to finance capital projects such as building schools, highways, sewer systems, etc. Funding for the debt typically comes from taxes based on a particular area associated with the particular municipal security. The credit risk indicator(s) that are associated with a geo-spatial area may provide an improved (e.g., more accurate) indication of credit risk for the particular security. For example, a high migration into a particular area, rising incomes in the particular and the like may provide a lower credit risk compared to a low migration into the area and reduced incomes. Accordingly, the previously nebulous connection is made precise by the geo mapping system of the present disclosure, and results in more accurate analysis of municipal securities.

Below are definitions of some of the terms described herein.

Geo-spatial cross reference: This is the process to take a single location and link it to various spatial areas such as (without being limited to) a city, MSA (described below), county, and/or state.

Conduit: In municipal finance, a conduit is an entity that is a corporate backer or obligor for an issue that is being brought to the market by an issuer not directly related to the conduit. An example is the NY St Dorm Authority (see FIG. 6) can issue bonds where the named obligor is an unrelated entity such as Vassar College or Brooklyn Law School. It is also typical for local economic development authorities to issue bonds under their name for a corporate backer such as United Airlines. This is important because if an issue has a conduit such as Vassar College or United Airlines, those conduit entities are responsible for paying the debt and not the issuer. Therefore, the geo-spatial characteristics would be linked to the conduit's location as opposed to the issuer's location.

Issuer Parent Org ID: This is a numerical identifier that may be used to represent municipal issuers.

Conduit Org ID: This is a numerical identifier that may be used to represent conduit entities.

Issue Key: This is a numerical identifier used to represent a single transaction (or deal as referenced herein) that is brought to the market by a municipal issuer. Municipal issuers may release numerous deals. A unique Issue Key may be assigned to each individual deal.

Geo_Multi_Type: This is an assigned indicator (e.g., manually assigned) for a municipal issuer that crosses across multiple spatial areas such as multiple cities, multiple counties, multiple MSAs, or multiple states.

Taxable GO WTS: This refers to Taxable General Obligation Warrants. In general, this represents a taxable security (most municipals are tax exempt per income) that is paid out of the issuer's general fund.

GO Purp Ref Bds: This refers to General Obligation Multi-Purpose Refunding Bonds. This represents a security that is paid out of the issuers general fund. The purpose is broad across that issuer. The security is a refunding security so it is paying down previously issued debt.

Instrument ID: Represents an example of an instrument identifier (ID) for a municipal security. In some examples, the process of the present disclosure may link geo-spatial data to Issuers, Issues and Obligors within the Municipal's Capital Structure. This step of the process takes that data and associates it with the Securities associated with a Municipal's Issuer, Issue and Obligor. In the example shown in FIG. 6, for Instrument ID 7660784, any geo-spatial data at the NY St Dorm Auth Series 2011G Issue and NY St Dorm Authority Issuer is associated with that Instrument ID.

Issuer Parent Org ID: When a municipal issuer first brings a deal to market, the geo mapping system may automatically create a numerical identifier for that issuer. That identifier may be used going forward for all deals issued by that issuer.

Conduit Org ID: When a conduit entity backs a municipal issue for the first time, the geo mapping system may automatically assign a numerical identifier to that conduit entity. That identifier may be used going forward for all deals backed by that conduit entity.

Issuer Key: For each deal that comes to market, the geo mapping system may automatically assign a system generated numerical identifier.

FIG. 1 is a functional block diagram of example geographical mapping and distribution system 100 (referred to herein as system 100). System 100 may include one or more geo mapping servers 102 (also referred to herein as server(s) 102), one or more data sources 104 and one or more dissemination entities 106. In some examples, geo mapping server(s) 102 may be configured to communicate with one or more administrators 128. In some examples, components of system 100 may be communicatively coupled via one or more communication networks 108. Network(s) 108 may include, for example, a private network (e.g., a local area network (LAN), a wide area network (WAN), intranet, etc.) and/or a public network (e.g., the Internet).

Data source(s) 104 may include one or more data sources 110 for geo-spatial data, one or more data sources 112 for geo-spatial (GS) characteristic data and one or more data sources 114 for security data. Although data sources 110-114 are illustrated as separate data sources, in general, data sources 110-114 may be embodied as separate data sources, may be embodied as part of a same data source and/or any combination thereof. In general, data source(s) 104 may include any suitable source(s) of data for geo-spatial data, geo-spatial characteristic data and security data for one or more securities (including municipal security(s)). Although examples of data source(s) 104 described herein relate to US-based data, it is understood that the present disclosure is not limited to US-related data, and that system 100 may be used with data associated with one or more locations around the world. In general, data source(s) 104 may comprise a server computer, a desktop computer, a laptop, a smartphone, a tablet, or any other electronic device known in the art configured to capture, receive, store and/or disseminate any suitable data.

Geo-spatial data source(s) 110 may include any data source that may provide any suitable geo-spatial data associated with one or more locations. In general, geo-spatial data may represent information describing one or more objects, one or more events and/or one or more other features associated with at least one location on or near the surface of the earth. In some examples, geo-spatial data may include location information and attribute information (e.g., of object(s), event(s), etc.) together with temporal information (e.g., a lifespan at which the location and attribute(s) may exist). In some examples, the geo-spatial data may include one or more of (without being limited to) demographic data, economic data, social data and healthcare data associated with one or more locations (e.g., a city, a county, a state, a region, a country, a continent, etc.). In some examples, geo-spatial data (including, in some examples, for geo-spatial cross reference sourcing) may be provided by data source(s) 110 including, without being limited to, one or more of the US Census Bureau (including tying the data to other data sources provided by the US Census Bureau for example data on population density), the US Geological Survey, the US Bureau of Land Management, the US Bureau of Labor Statistics and the Centers for Disease Control and Prevention.

GS characteristic data source(s) 112 may include any data source that may provide an indication of credit risk, which credit risk indication(s) may impact at least one security. In general, GS characteristic data may include (without being limited to) one or more of population, income, migration, labor statistics, housing, education, healthcare and any other suitable data that may be associated with a credit risk. In some examples, GS characteristic data may be provided by data source(s) 112 including, without being limited to, workforce data (e.g., salary, turnover, compensation, labor costs, etc.) of one or more organizations, US Census Bureau (e.g., population density), the US Geological Survey, the US Bureau of Land Management, the US Bureau of Labor Statistics and the Centers for Disease Control and Prevention. In some examples, GS characteristic data may be obtained based on analysis of data from among geo-spatial data source(s) 110.

Security(s) data source(s) 114 may include any data source that may provide data for one or more securities, including (in some examples) municipal securities. In some examples, US municipal security data may be sourced from data source(s) 114, and may include (without being limited to) one or more of official statements (e.g., via one or more websites such as the Electronic Municipal Market Access (EMMA) Municipal Securities Rulemaking Board (MSRB) website), preliminary official statements (e.g., available through the EMMA MSRB website), new issue data obtained from one or more new issue data services such as the New Issue Information Dissemination Service (NIIDS) (e.g., a third party feed used to processes new issue information) and municipal security data sourced directly from one or more underwriters and/or financial advisors (e.g., via one or more websites, data feeds, electronic messages and the like). In some examples, a bond offering (for a municipal security) may be announced (e.g., at an issue level) by one or more data source(s) 114 such as a new issue calendar, one or more news wires, an issuer of an instrument identifier (ID) and/or by one or more lead managers and/or financial advisors. In some examples, the bond offering may indicate one or more financial instruments associated with the bond offering. In some examples, instrument and/or issue data (for municipal security) may be updated from among various data source(s) 114, such as, without being limited to, one or more of worksheets, sale results, official statements, data directly from agents and disclosure documents. In some examples, issuer data of at least one municipal security may be collected based on one or more of (without being limited to) security information (e.g., Instrument ID), its description, from official statements and an issuer's financial reports.

Although examples described herein relate to linking geo-spatial data with (US) municipal securities, the present disclosure is not limited to municipal securities and may be configured for any other suitable type of security (as well as geo-spatial data other than US-based data). In some examples, other geo-spatial datasets could be leveraged (for example, from the United Nations and/or World Bank) and tied to other asset classes such as sovereign bonds, debt issued by governments (for example US Treasury Bonds), etc. In general, provided that system 100 is able to determine and generate common keys and cross-references between one or more types of security and geo-spatial data, then that data may be represented at the security level.

Dissemination entity(s) 106 may include any suitable output device, system and/or platform for providing output data from server(s) 102. In some examples, dissemination entity(s) 106 may include (without being limited to) one or more of one or more client devices, one or more external data distribution systems, one or more delivery platforms and the like. In some examples, external data distribution system(s) may include one or more external databases, such as one or more cloud-based relational databases. In some examples, server(s) 102 may deliver a same resulting output data through one or more various delivery platforms (e.g., according to any suitable data formatting, such as for interactive presentation in a website, in a spreadsheet, on a mobile device and the like). In some examples, the output data (e.g., instrument-level data and/or credit risk indicator(s) for security(s)) may be embedded into security analysis and decision-making workflows (e.g., for end users). For example, a portfolio manager may use the data to differentiate characteristics of security cohorts being considered for investment. In some examples, the credit risk indicator(s) may provide a further layer of information about a security that can influence a decision to buy or sell a security.

Client devices (an example of dissemination entity(s) 106) according to the present disclosure may include, without limit, any combination of mobile phones, smart phones, tablets computers, laptop computers, desktop computers, server computers or any other computing device configured to capture, receive, store and/or disseminate any suitable data. In one embodiment, a client device may include a non-transitory memory, one or more processors including machine readable instructions, a communications interface which may be used to communicate with the geo mapping system, a user input interface for inputting data and/or information to the client device and/or a user display interface for presenting data and/or information on the client device. In some examples, a client device may be represented by computer system 1100 (shown in FIG. 11). In some examples, the user input interface and the user display interface may be configured as at least one graphical user interface (GUI) (e.g., for presentation of interactive GUI(s) 126).

Geo mapping server(s) 102 may include data aggregator 116, at least one data structure 118, geo mapping generator 120, data distributor 122 and data interface 124. Server(s) 102 may include one or more main computer servers in electronic communication with data source(s) 104 and dissemination entity(s) 106 (e.g., one or more output devices and/or systems such as client device(s), external data distribution system(s), delivery platform(s) and the like).

Figure 11:
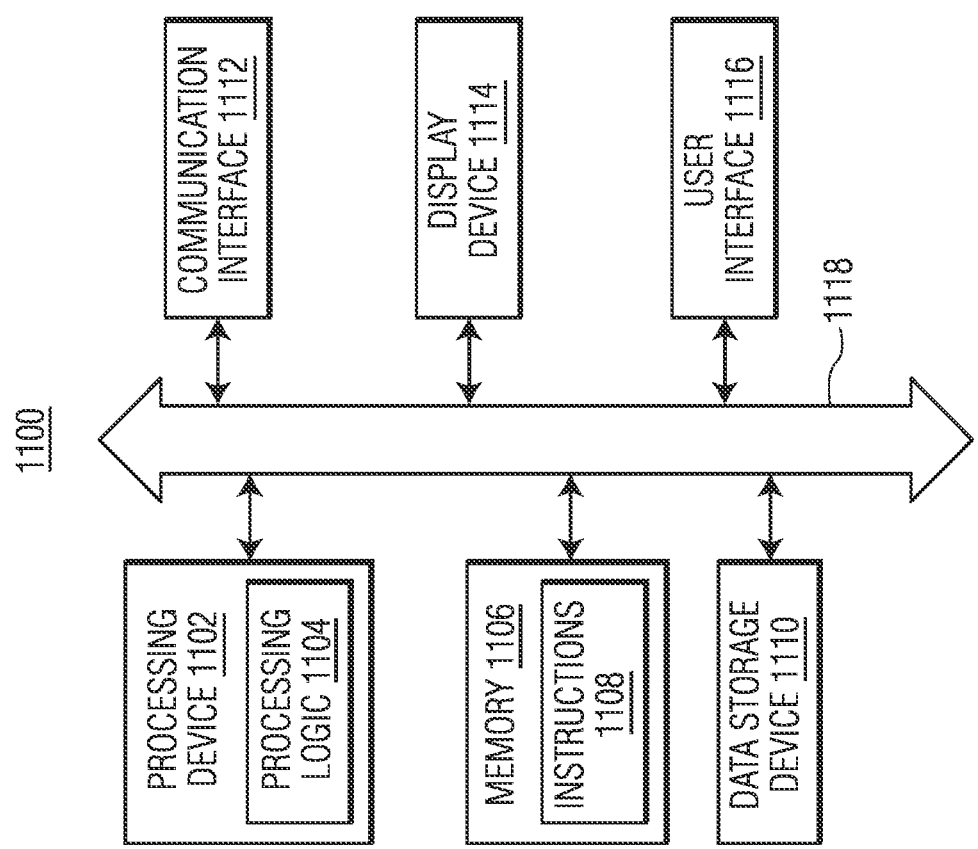
FIG. 11 is a functional block diagram of an example computer system according to an aspect of the present disclosure.

In general, server(s) 102 may include at least one processor, one or more interfaces (e.g., an electronic device including hardware circuitry, an application on an electronic device) for communication with other components of system 100 (e.g., data source(s) 104, dissemination entity(s) 106) and non-transitory memory storing one or more routines and or algorithms (e.g., statistical algorithms). In some examples, the server(s) 102 may also include additional storage (e.g., one or more databases) for storing data and/or information associated with the various functions of system 100. In some examples, server(s) 102 may be represented by computer system 1100 (FIG. 11).

Data aggregator 116 may be configured to obtain data from among data source(s) 104, including geo-spatial data, GS characteristic data and security data (e.g., via respective data sources 110-114). Data aggregator 116 may be configured to generate separate data tables for the geo-spatial data, GS characteristic data and security data and enter the obtained data into the respective data tables (e.g., data tables 214-218 shown in FIG. 2). The data tables may be stored in data structure(s) 118. In some examples, data aggregator 116 may be configured to perform one or more of filtering, normalization and formatting of the obtained data prior to entering the data in the respective data tables. Data aggregator 116 may also be configured to determine one or more cross-references between one or more zip codes and one or more geo-spatial areas, generate at least one separate cross-reference data table and enter the determined geo-spatial cross reference data in the cross-reference data table(s) (e.g., data table(s) 220 shown in FIG. 2). The cross-reference data table(s) may be stored in data structure(s) 118. Data aggregator 116 is described further below with respect to FIG. 2.

Figure 2:
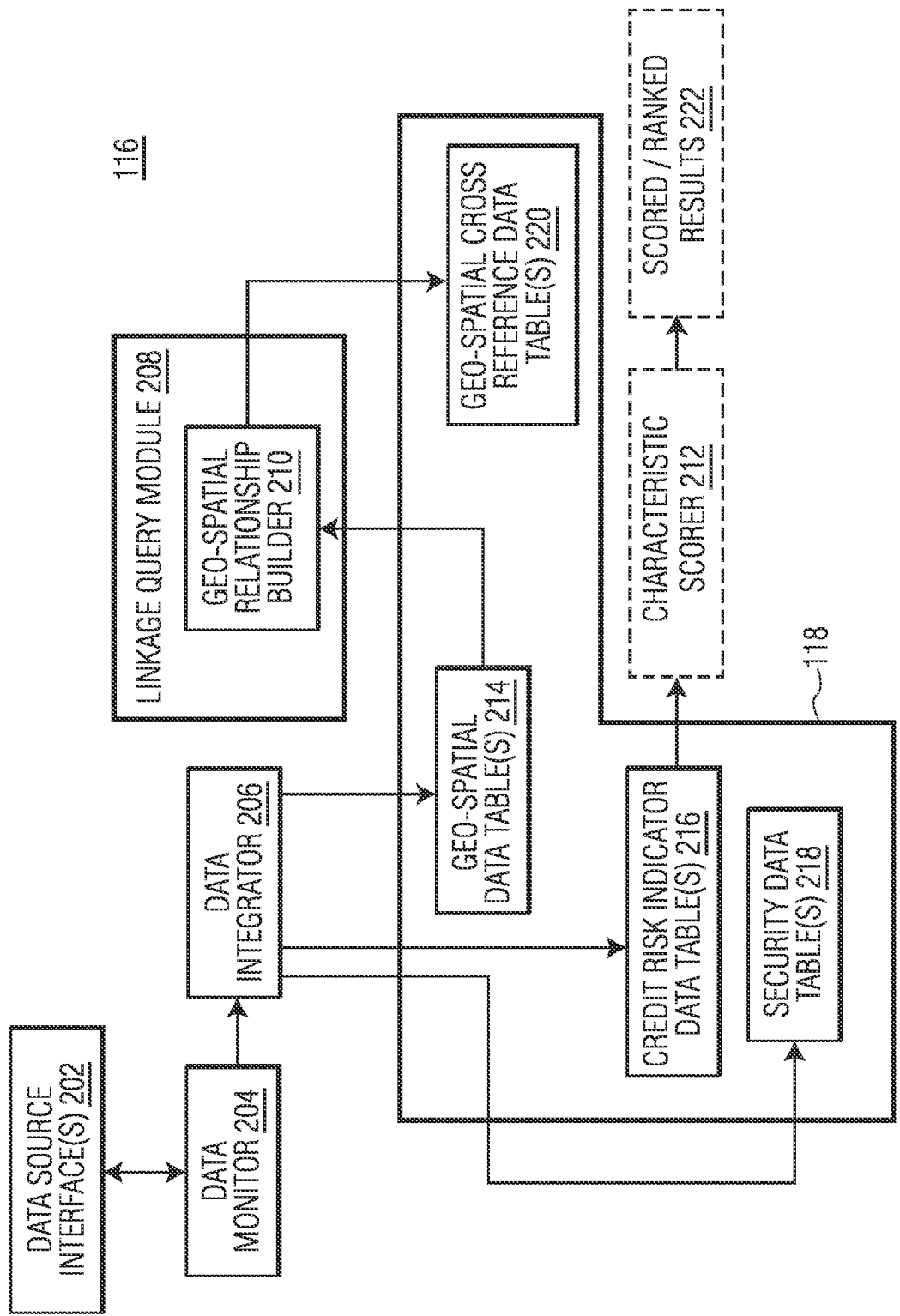
FIG. 2 is a functional block diagram of an example data aggregator of the system of FIG. 1, according to an aspect of the present disclosure.
Figure 3:
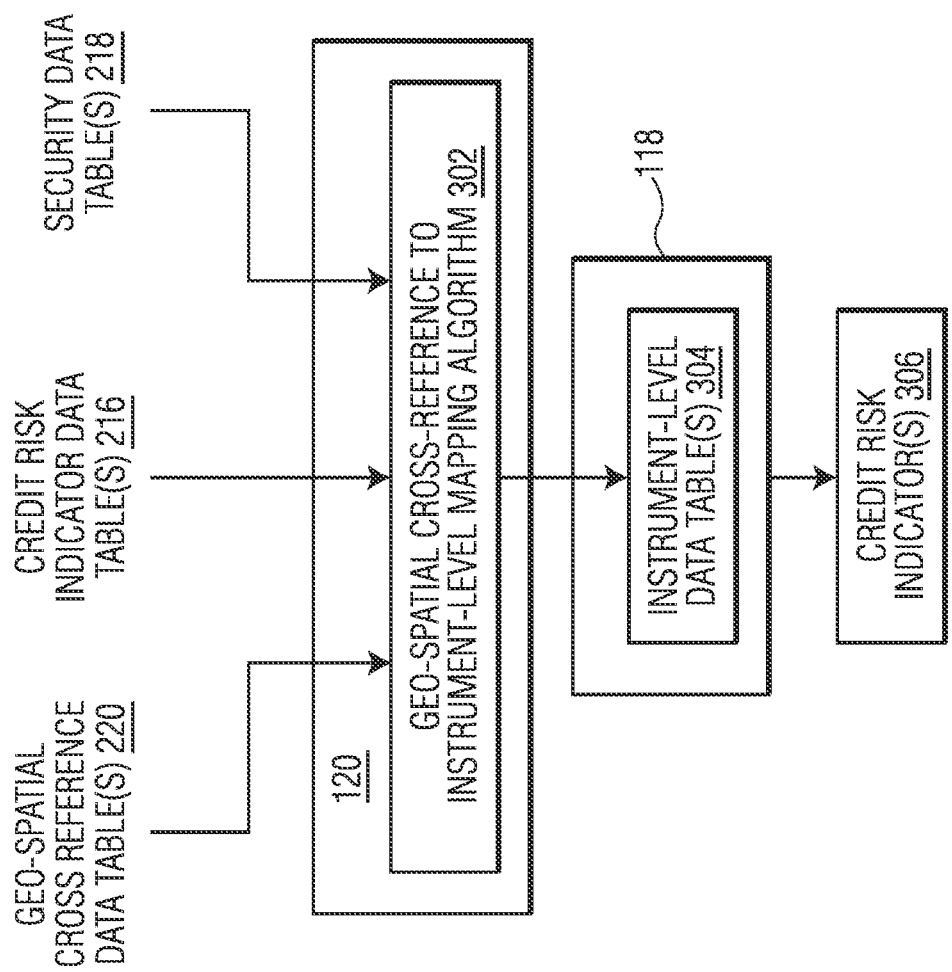
FIG. 3 is a functional block diagram of an example geo mapping generator of the system of FIG. 1, according to an aspect of the present disclosure.

In some examples, data structure(s) 118 may include one more databases and/or one in-memory caches. In some examples, the database(s) may include at least one relational database. In a non-limiting example, the database(s) may include Oracle® database(s). Data structure(s) 118 may be configured to store the separate data tables generated for geo-spatial data (from data aggregator 116 via data source(s) 110), credit risk indicator data (from data aggregator 116 via data source(s) 112), security data (from data aggregator 116 via data source(s) 114), geo-spatial cross reference data (determined by data aggregator 116) and instrument-level data for one or more securities (determined by geo mapping generator 120). Referring to FIGS. 1-3, the separate data tables may include geo-spatial data table(s) 214, credit risk indicator data table(s) 216, security data table(s) 218, geo-spatial cross reference data table(s) 220 and instrument-level data table(s) 304. In general, data structure(s) 116 may be configured to provide separate database storage of data tables 214-220 and 304. In some examples, data tables 214-220 and 304 may provide geo-spatial link(s) between security(s) (e.g., municipal security(s)) and credit risk indicators that may be sourced and indexed by location. In some examples, data among the various data tables 214-220 and 304 may be updated based on one or more events that may be associated with each of those datasets.

Referring back to FIG. 1, geo mapping generator 120 may be configured to retrieve credit risk indicator data, security data (e.g., municipal security data) and geo-spatial cross reference data from among respective separate data tables (e.g., respective data tables 216-220) among data structure(s) 118. Geo mapping generator 120 may use the retrieved data to determine linkages between the geo-spatial data, the security data and one or more credit risk indicators. In particular, geo mapping generator 120 may include at least one mapping algorithm to generate a mapping (based on the retrieved data) between the geo-spatial cross-reference data to instrument-level data and credit risk indicator(s) for at least one security. Geo mapping generator 120 may store the instrument-level data in one or more data tables (e.g., data table(s) 304 shown in FIG. 3). Geo mapping generator 120 is described further below with respect to FIG. 3.

Data distributor 122 may include one or more delivery mechanisms for providing output data (e.g., credit risk indicator(s) for security(s)) in one or more data dissemination formats. In some examples, the data dissemination format(s) may include standard data format(s) and/or propriety dissemination format(s) (e.g., a propriety format associated with a particular external distribution system). In some examples, the delivery mechanism(s), may provide output data in one or more file-based formats, including, in some examples, in both XML and flat file configurations. In some examples, output data may be accessed by dissemination entity(s) 106 (e.g., client device(s), external distribution systems(s) and/or delivery platform(s)) via bulk deliveries, and the output data may be loaded into one or more external operational databases, such as cloud-based database(s). In some examples, one or more users may access and/or query output data from server(s) 102 via the external cloud-based database(s). In some examples, data distributer 122 may be configured to communicate with one or more external (e.g., third party) messaging systems for streaming data (including real-time streaming) between server(s) 102 and dissemination entity(s) 106.

Data interface 124 may be configured to present at least one interactive graphical user interface (GUIs) 126 on dissemination entity(s) 106 (e.g., client device(s), external distribution systems(s), delivery platform(s)) and/or client device(s) (e.g., any combination of mobile phones, smart phones, tablets computers, laptop computers, desktop computers, server computers or any other computing device configured to capture, receive, store and/or disseminate any suitable data) of administrator(s) 124. In some examples, data interface 124 may include a web portal and/or a website. In general, data interface 124 may be configured for collection and/or dissemination of data to dissemination entity(s) 106 and/or administrator(s) 128. In some examples, interactive GUI(s) 126 may be configured to generate one or more interactive webpages that may provide interactive searching tools for one or more securities, one or more user input tools for selection of security(s) of interest and selection of one or more credit risk indicators, and one or more interactive presentation tools for viewing instrument-level data and/or credit risk indicator(s) for one or more geo mapped securities (as determined by system 100). In some examples, interactive GUI(s) 126 may include one or more user input tools and one or more interactive presentation tools for interacting with data aggregator 116 and/or geo mapping generator 120 by administrator(s) 128. In some examples, administrator(s) 128 may interact with data aggregator 116 via interactive GUI(s) to aid in the collection of geo-spatial information associated with one or more securities (e.g., munis). In some examples, administrator(s) 128 may interact with geo mapping generator 120 via interactive GUI(s) to adjust one or more parameters associated with mapping algorithm 302 (FIG. 3). In some examples, the delivery mechanism(s) of data distributer 122 may disseminate the output data to dissemination entity(s) 106 via graphical user interface (GUI) 126 of data interface 124. Examples of interactive GUI(s) 126 are described further below with respect to FIGS. 10A-10G.

FIG. 2 is a functional block diagram of example data aggregator 116 of geographical mapping and dissemination system 100 (FIG. 1). Data aggregator 116 may include one or more data source interfaces 202, data monitor 204, data integrator 206, linkage query module 208 and, in some examples, optional characteristic scorer 212. Data aggregator 116 may be configured generate data tables 214-220 and may communicate with data structure(s) 118 for storage of data tables 214-220.

Data source interface(s) 202 may be configured to communicate with data source(s) 104 (FIG. 1). Data source interface(s) 202 may obtain data and/or information from among data source(s) 104 through one or more live data feeds, through one or more file transfers, including, in some examples, secure file transfer(s), by data being pushed to the server(s) 102 and/or by server(s) 102 (via data source interface(s) 202) pulling and/or extracting data/information from among data source(s) 104. In some examples, a number of communication protocols may be utilized by server(s) 102 (including data source interface(s) 202) to retrieve, process and deliver data to components within system 100. In some examples, communication protocols utilized by server(s) 102 may include, without being limited to, one or more of hypertext transfer protocol secure (HTTPS), secure file transfer protocol (SFTP), Java Database Connectivity (JDBC), multicast and one or more messaging protocols. Data obtained from among data source(s) 104 via data source interface(s) 202 may be provided to data monitor 204.

Data monitor 204 may be configured to monitor data source(s) 104 (including data from among data source(s) 110-114) and identify any data among the data source(s) 104 for inclusion in one or more among data table(s) 214-220, responsive to the monitoring. In some examples, data monitor 204 may be configured to continually monitor data (e.g., in real-time and/or near real-time) from among data source(s) 104. In some examples, data monitor 204 may be configured to detect, based on the continual monitoring, one or more changes in monitored data (e.g., updates to an existing security, changes to a coverage area by an existing zip code and the like) and/or may identify new data (e.g., a new security, new credit risk indicators, a new zip code and the like). In some examples, data monitor 204 may include a municipal security data monitor to monitor information disclosed about municipal securities (e.g., issuer, issue and/or instrument disclosure information) among security(s) data source(s) 114 (e.g., issuers agents such as disclosure agents and/or financial advisors, news sources, ratings agencies, EMMA, etc.). In some examples, data monitor 204 may monitor data source(s) 114 for event filing data such as, without being limited to, one or more of merger data, consolidation data, acquisition and/or sales data, default data and financial and/or operating data. Data monitor 204 may transmit any monitored data, including any detected changes and/or newly identified data) to data integrator 206 for further processing.

Data integrator 206 may be configured to generate data tables 214-218 and enter the monitored data into suitable tables among data tables 214-218. Data integrator 206 may also be configured to update one or more entries among data tables 214-218 responsive to any changes to the monitored data (as detected by data monitor 204). In addition, data integrator 206 may be configured to add one or more entries to an existing table among data tables 214-218 and/or may generate a new table among data tables 214-218 in response to the detection of new data (as detected by data monitor 204).

In some examples, data integrator 206 may be configured to at least one of reformat the monitored data to a common format and/or normalize the monitored data (from among data source(s) 104) prior to entering the data among data tables 214-218. In some examples, data integrator 206 may be configured to filter the monitored data (e.g., based on one or more predetermined parameters) so that any data that meets the predetermined parameter(s) may be entered among data table(s) 214-218. In some examples, one or more of reformatting, normalization and filtering operations may be performed by data monitor 204.

More specifically, data integrator 206 may generate one or more geo-spatial data tables 214, one or more credit risk indicator data tables 216 and one or more security data tables 218. Data integrator 206 may selectively enter the monitored data into data tables 214-218, such that geo-spatial data from data source(s) 110 may be stored in geo-spatial data table(s) 214, credit risk data from data source(s) 112 may be stored in credit risk indicator data table(s) 216 and security data from data source(s) 114 may be stored in security data table(s) 218.

In a non-limiting example, data integrator 206 may include at least one tool kit (e.g., Oracle® Spatial and Graph) to convert data source files having at least one data format (e.g., Topologically Integrated Geographic Encoding and Referencing (TIGER), shapefiles (including line shapefiles), etc.) into data tables 214-218 that may be stored in data structure(s) 118 (e.g., one or more databases). In a non-limiting example, the database(s) may include Oracle® database(s). In a non-limiting example, the tool kit(s) may be configured to convert TIGER/Line Shapefiles provided by the US Census (an example of data source(s) 110) into geo-spatial data table(s) 214 which contain geographic identifier information (e.g. zip code, county subdivision Federal Information Processing Series (FIPS) code, county FIPS code, state FIPS code, core base statistical area (CBSA), etc.) and a column of type SDO_GEOMETRY which may contain information for performing geographic calculations and geographic joins on the data. In some examples, an SDO_GEOMETRY column in a zip code table may be used to join to the SDO_GEOMETRY column in a county subdivision table to map a zip code to a county subdivision.

In some examples, census data (e.g., an example of data source(s) 110) may provide TIGER/Line Shapefiles for various geo-spatial areas. A Census TIGER/Line Shapefile may contain some unique geographic identifier information (e.g., zip code, county subdivision FIP, county FIP, state FIP, etc.) along with geo-spatial data about the identifier which allows for calculation of various areas and locations around the world. Some of the census geo-spatial areas may be hierarchical, for example all county subdivisions may be geo-spatially located within a county, all counties may be located within a state, etc. Some data, such as zip codes, may be outside of a standard hierarchy.

Credit risk indicator data table(s) 216 may be configured to store one or more credit risk indicators that may be associated with one or more geo-spatial areas (e.g., a city, subdivision, county, state, MSA level (described below), CBSA, etc.). In some examples, data integrator 206 may be configured to analyze GS characteristic data from data source(s) 112 and may identify one or more indications of credit risk among the analyzed data associated with one or more geo-spatial locations. Data integrator 206 may store the credit risk indication(s) in data table(s) 216 according to geo-spatial area(s). Data table(s) 216 may represent data at one more geo-spatial areas that may be useful for mapping to one or more securities. The data in data table 216 may change dependent on data source(s) 112. In some examples, changes to the data may be infrequent, for example if leveraging US Census data, or may be more frequent if leveraging monthly employment data. Table 1 below illustrates an example data table 216, where the credit risk indicator may include a population estimate (2109 Census Bureau estimate) with respect to county (e.g., a geo-spatial area).

TABLE 1

Example credit risk indicator data table.

| County Name | Population Estimate |
|---|---|
| Cherokee | 26,196 |
| Dekalb | 71,513 |

Data stored in credit risk indicator data table(s) 216 may include, without being limited to, one or more of economic data, demographic data, etc. (i.e., any data that may be a suitable indicator of credit risk) associated with a particular geo-spatial area(s). Some examples include, total population, manufacture level, income level of a segment of the population, healthcare information, etc. In some examples, the data may include multiple attributes (e.g., associated with multiple credit risk indicators).

Figure 6:
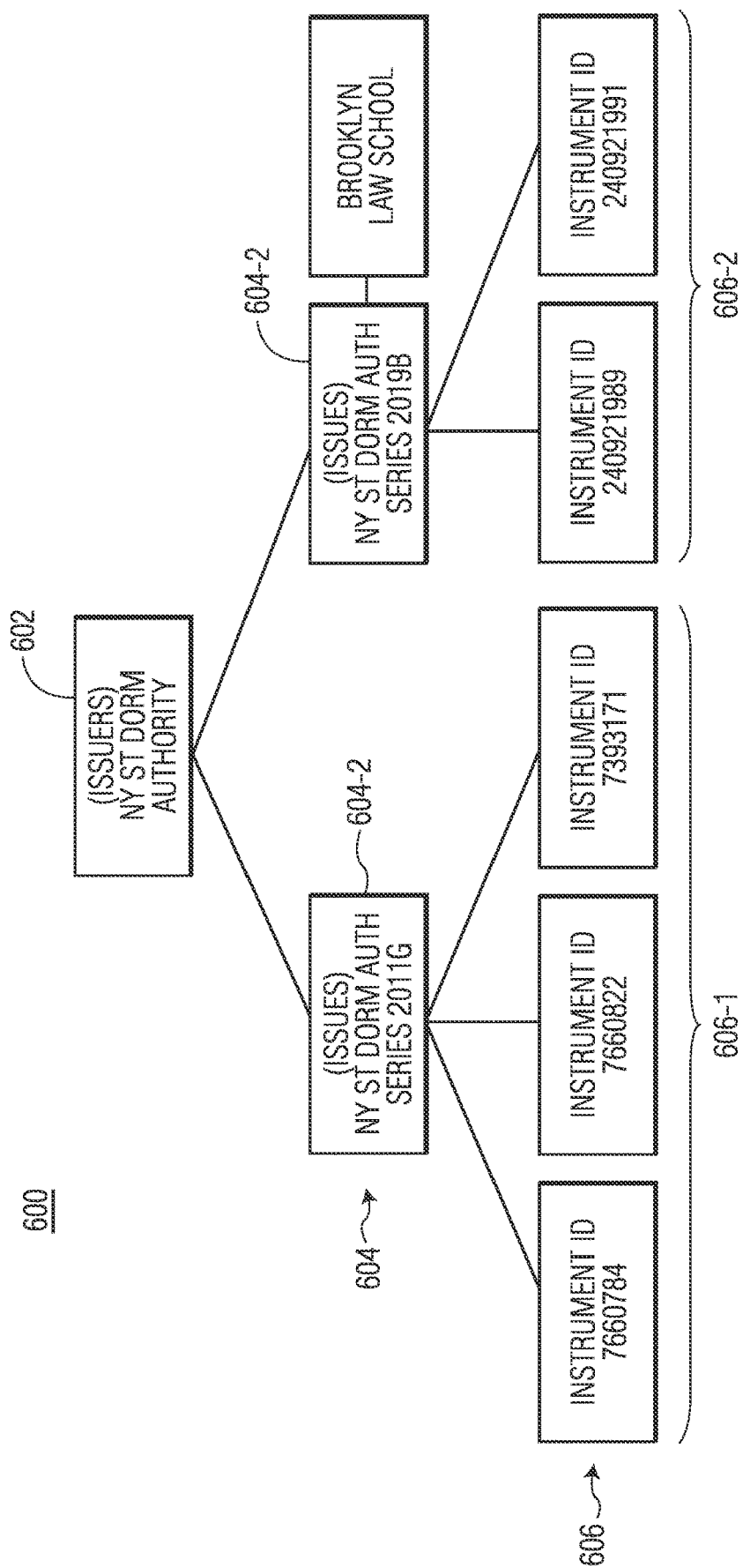
FIG. 6 is a hierarchy diagram illustrating example relationships for an example municipal bond structure, according to an aspect of the present disclosure.

Security data table(s) 218 may be configured to store security data associated with one or more securities. In some examples, the security data may include data for one or more municipal securities. In general, a municipal security may have a hierarchical structure that may include one or more issuers, one or more issues and one or more instruments. Referring to FIG. 6, a hierarchy diagram illustrating example municipal bond structure 600 is shown. Structure 600 includes issuer 602, issues 604 and instruments 606. In this example, structure 600 includes one issue 602 (e.g., New York State Dormitory authority). Issuer 602 is associated with two issues 604-1 and 604-2. In this example, issue 604-2 is also associated with the Brooklyn Law school. Issue 604-1 is associated with instruments 606-1 and issue 604-2 is associated with instruments 606-2. Instruments 606 may be associated with respective instrument identifiers (IDs). In some examples, municipal security data may also include information of one or more obligors associated with at least one instrument.

Linkage query module 208 may be configured to receive data from among geo-spatial data table(s) 214 and generate one or more geo-spatial cross reference data tables 220. Data tables 220 may be stored in data structure(s) 118. Linkage query module 208 may include geo-spatial relationship builder 210 (also referred to herein as builder 210). Builder 210 may include one or more algorithms (e.g., statistical algorithms) for determining one or more cross-references (based on the geo-spatial data in data table(s) 214) between zip codes and one or more geo-spatial areas (e.g., cities, counties, states, metropolitan statistical areas and/or micropolitan statistical areas). As used herein, the term MSAs refers collectively to metropolitan statistical areas and/or micropolitan statistical areas.

In general, a metropolitan statistical area refers to a geographical region with a relatively high population density and close economic ties throughout the area. In some examples, a metropolitan statistical area may be centered on a single large city that exerts substantial influence over the region, such as New York City. In some examples, a metropolitan statistical area may include more than one large city, such as Minneapolis-Saint Paul. A micropolitan statistical area, in general, represents a smaller population center than a metropolitan statistical area, that may not have the economic and/or political influence of a large city, but represents a significant center of population and production. According to the US Office of Management and Budget, metropolitan statistical areas have at least one urbanized area of 50,000 or more population (as well as adjacent territory that has a high degree of social and economic integration with the core as measured by commuting ties), whereas micropolitan statistical areas have at least one urban cluster of at least 10,000 but less than 50,000 population (plus adjacent territory that has a high degree of social and economic integration with the core as measured by commuting ties).

Builder 210 may be configured to define cross-reference between the different geo-spatial areas. In some examples, builder 210 may perform a statistical analysis (e.g., via one or more statistical algorithms) to determine a best relationship between a zip code and another geo-spatial area. In some examples, the statistical analysis may include determining a "best relationship" based on the maximum area of intersection between the geo-spatial area of a zip code and the geo-spatial area of a county subdivision. In some examples, a linkage query that maps zip codes to county subdivision may factor in additional data other than a maximum area of intersection, such as population size, etc. It may be appreciated that linking a zip code to a geo-spatial area is not necessarily a one-to-one relationship. A zip code can span a city, a state, an MSA (e.g., a tri-state area, etc.). A statistical analysis may be performed to determine a best fit according to at least one predetermined criteria (e.g., a coverage area, a population density, etc.).

Figure 5C:
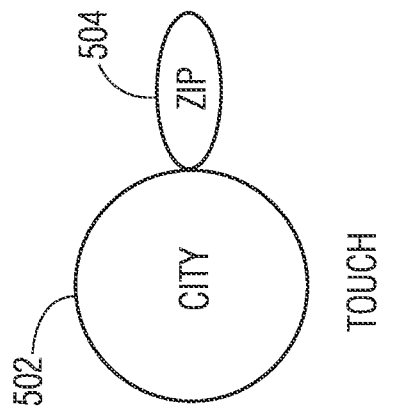
FIGS. 5A, 5B and 5C are schematics illustrating various example cross-reference relationships that may be determined between a zip code and a geo-spatial area, according to an aspect of the present disclosure.
Figure 5B:
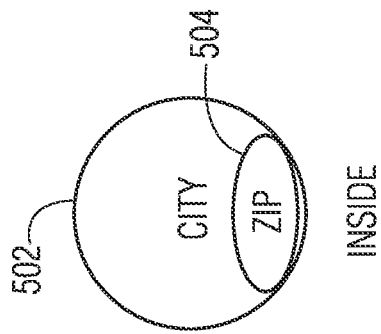
Figure 5A:
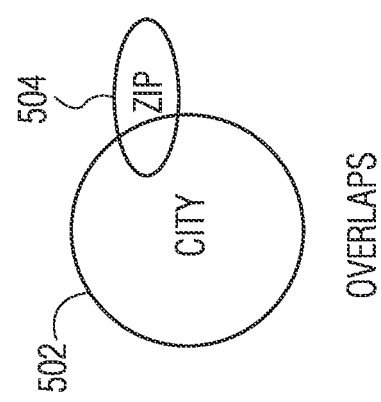

FIGS. 5A-5C are schematics illustrating various example cross-reference relationships that may be determined by builder 210 between a zip code and a geo-spatial area. In FIGS. 5A-5C, an example geo-spatial area is represented as city 502. In this example, builder 210 may determine a cross-reference relationship based on whether a portion of zip code 504 (referred to as "Zip" 504 in FIGS. 5A-5C) overlaps with city 502 (FIG. 5A), whether zip code 504 is (completely) inside of city 502 (FIG. 5B) or whether zip code 504 touches (without overlapping) city 502. Table 2 provides an example set of cross-reference relationships for a zip code with a number of cities. It is understood that the example technique shown in FIGS. 5A-5C represent a non-limiting example of determining cross-reference relationships between a zip code and geo-spatial area(s) and that any other suitable technique (e.g., population density, type of industry, workforce size, etc.) for determining cross-reference relationship(s) may be used.

TABLE 2

Cross-reference relationships between one zip code and multiple cities.

| Zip Code | City | Relationship | Coverage (sq. km) |
|---|---|---|---|
| 35967 | Fort Payne | Overlaps | 293.1 |
| 35967 | Leesburg | Overlaps | 23.5 |
| 35967 | Collinsville | Overlaps | 6.4 |

TABLE 2-continued

Cross-reference relationships between one zip code and multiple cities.

| Zip Code | City | Relationship | Coverage (sq. km) |
|---|---|---|---|
| 35967 | Valley Head-Mentone | Overlaps | 1.6 |
| 35967 | Fyffe | Touch | 0 |

In some examples, builder 210 may determine further cross-reference relationships between a zip code and different geo-spatial areas based on the resulting intersectional cross-reference relationships (e.g., as shown in Table 2). For example, builder may determine a set of cross-reference relationships between different sized geo-spatial areas (e.g., at city level, county level, state level and MSA level areas). Table 3 provides example relationships for two zip codes to different geo-spatial areas. Table 3 represents an example geo-spatial cross reference data table 220.

TABLE 3

Cross-reference relationships between zip codes and different geo-spatial areas.

| Zip Code | City | County | State | MSA |
|---|---|---|---|---|
| 35959 | Cedar Bluff-Gaylesville | Cherokee | Alabama | |
| 35967 | Fort Payne | DeKalb | Alabama | Fort Payne, AL Micro Area |

Data table(s) 220 may define cross-references between zip codes and other geo-spatial area(s). This type of table may change as the relationships change between the different geo-spatial entities. For example, as the US Post Office issues new Zip Codes or changes their coverage areas (postalpro.usps.com/postal-bulletin-changes) builder 210 may need to re-assess the relationship of those zip codes to other geo-spatial entities (e.g., cities and/or counties).

In one non-limiting example, builder 210 may create one or more geo linkage tables linking one or more zip codes to a number of different types of geo-spatial areas. For example, a zip code may be linked to: a) a county subdivision (including resolving any cases where multiple zip codes cover the same county subdivision by selecting the zip code with the maximum coverage of that county sub division), b) a CBSA (including resolving any cases where multiple zip codes cover the same CBSA by selecting the zip code with maximum coverage of that CBSA) and c) a county and state (e.g., by joining a county subdivision already linked to the zip code to a county and linking the county to a state using CENSUS tables). An example portion of data table 220 illustrating additional linkage information is shown in Table 4 below. In Table 4, the column "Multi-State CBSA" may provide an indication of whether the zip code includes a geo-spatial area that spans more than one state.

TABLE 4

Example portion of a cross-reference geo-spatial data table.

| Zip Code | County Subdivision FP | County Subdivision Name | County FP | County Name | State Name | CBSA Name | Multi-State CBSA |
|---|---|---|---|---|---|---|---|
| 36345 | 91584 | Headland-Newville | 67 | Henry | Alabama | Dothan, AL | No |
| 36353 | 91584 | Headland-Newville | 67 | Henry | Alabama | Dothan, AL | No |

TABLE 4-continued

Example portion of a cross-reference geo-spatial data table.

| Zip Code | County Subdivision FP | County Subdivision Name | County FP | County Name | State Name | CBSA Name | Multi-State CBSA |
|---|---|---|---|---|---|---|---|
| 36258 | 91899 | Lineville | 27 | Clay | Alabama | | No |
| 36266 | 91899 | Lineville | 27 | Clay | Alabama | | No |

In some examples, geo mapping generator 120 (FIG. 1) may be configured to utilize data in geo-spatial cross-reference data table(s) 220 to link to a given muni instrument, by keying (e.g., selecting) one or more (e.g., a variety of) other geographic identifiers. Builder 210 may be configured to link a zip code to one or more other geographic identifiers, for example, using a geo-spatial join between the geo area defined in data from data source(s) 104, including, in some examples, TIGER/Line Shapefile for zip codes and at least one geo area as defined in the TIGER/Line Shapefile for a county subdivision. Builder 210 may be configured to map a zip code to a county subdivision. Other geographic identifiers may then be determined for that zip code based on a hierarchical relationship of county subdivisions. In addition, as more data sets are incorporated into the geo mapping system, keyed by other types of geographic identifiers, the same process may be used to map zip code(s) to other geographic hierarchies (e.g., school districts, census tracts, etc.).

Optional characteristic scorer 212 of data aggregator 116 may be configured to determine a score and/or a ranking of credit risk indicator(s) among indicators stored in data table(s) 216, and may output optional scored and/or ranked results 222 (referred to herein is results 222). In some examples, characteristic scorer 212 may determine the score and/or ranking based on one or more predetermined formulas in accordance with one or more attributes of the data (e.g., economic, demographic, etc.) obtained from data source(s) 104. In some examples, results 222 may be provided (e.g., to geo mapping generator 120) instead of the credit risk indicator data itself. In some examples, results 222 may be provided in addition to the data for a particular geo-spatial area.

In some examples, different geo-spatial areas indicated in data table(s) 216 and 220 may be associated with different geo identifiers (referred to herein as a geoID). In this manner, data table(s) 216 and 220 may be searched by geoID for each geo-spatial area (e.g., zip code, county subdivision, county, state, CBSA). For example, Table 5 illustrates example geoIDs that may be assigned to the portion of the cross-reference geo-spatial data table shown in Table 4.

TABLE 5

Example geoIDs assigned to geo-spatial areas of the cross-reference geo-spatial data table shown in Table 4.

| Zip Code | County Subdivision geoID | County Subdivision Name | County geoID | County Name | CBSA geoID | CBSA Name |
|---|---|---|---|---|---|---|
| 36345 | 106791584 | Headland-Newville | 1067 | Henry | 20020 | Dothan, AL |
| 36353 | 106791584 | Headland-Newville | 1067 | Henry | 20020 | Dothan, AL |
| 36258 | 102791899 | Lineville | 1027 | Clay | | |
| 36266 | 102791899 | Lineville | 1027 | Clay | | |

FIG. 3 is a functional block diagram of an example geo mapping generator 120 of geographical mapping and distribution system 100 (FIG. 1). Geo mapping generator 120 may include at least one geo-spatial cross-reference to instrument-level mapping algorithm 302 (referred to herein as mapping algorithm(s) 302). Geo mapping generator 120 may be configured generate one or more instrument-level data tables 304 and may communicate with data structure(s) 118 for storage of data table(s) 304. Data table(s) 304 may also be used to generate one or more credit-risk indicators 306 (associated with the instrument-level data).

Mapping algorithm(s) 302 may be configured to retrieve data from among credit risk indicator data table(s) 216, security data table(s) 218, and geo-spatial cross reference data table(s) 220. Mapping algorithm(s) 302 may create a first link between one or more securities (stored in data table(s) 218) and at least one geo-spatial area based on the geo-spatial cross reference data in data table(s) 220. The first link may be determined from data table(s) 218 and 220 directly or indirectly. For example, for a municipal security, mapping algorithm(s) 302 may utilize the structure of the municipal security (e.g., offering) by linking at the issuer, issue and/or obligor level (see FIG. 6), for direct linking. In some examples, for indirect linking, geo-spatial data at the issuer, issue and/or obligor level may be determined by specifying a city, county and/or state and an associated zip code.

Mapping algorithm(s) 302 may also be configured to create a second link between one or more credit risk indicators in data table(s) 216 (or optional results 222 shown in FIG. 2) and the security(s) based on the first link, to form one or more instrument-level data, and store the instrument-level data in one or more data table(s) 304. For example, mapping algorithm(s) 302 may utilizing the geo-spatial cross reference data (data table(s) 220) and credit risk indicator data (data table(s) 216) at a geo-spatial level to link the credit risk indicator data to the financial instrument using its defined geo-spatial information (e.g., data at the instrument level).

As discussed above, the geo-spatial cross reference data and credit risk indicator data at a geo-spatial level may be used to link the data to the financial instrument using its defined geo-spatial information. In a non-limiting example where the security includes a municipal security, the geo-spatial cross reference data and credit risk indicator data may be applied at the issuer, issue and obligor level to the instrument in accordance with a predetermined hierarchy. The hierarchy may include (from a least to a most specific):

1. Issuer Parent Org Id (where any updates may apply to all instrument IDs that have no Conduit Org Id for that Issuer ParentOrg Id),
2. Issuer Parent Org Id and Conduit Org Id (where any updates may apply to all instrument IDs for that Issuer Parent Org Id and Conduit Org Id combination), 3
3. Issuer Parent Org Id, Issue Key (where any updates may apply to all instrument IDs for that Issue Key) and 4. Issuer Parent Org Id, Conduit Org Id, Issue Key (where any updates may apply to all instrument IDS for that Issue Key).

FIG. 8A is a table illustrating example instrument-level information (e.g., according to instrument ID) of various municipal bonds linked to geo-spatial areas, that may be created by the first link. FIG. 8A illustrates an example where an instrument may be linked to one geo-spatial area. In some examples, an instrument may be linked to more than one geo-spatial area. FIG. 8B is a table illustrating example instrument-level information for an instrument linked to two geo-spatial areas. FIG. 9 is an example data table storing instrument-level information linked to credit risk information, which may be created by the second link. In FIG. 9, the population estimates represent an example of a credit risk indicator. In some examples, FIG. 9 represents an example of instrument-level data table(s) 304.

Data table(s) 304 may contain the data mapped though the geo-spatial processes to at least one instrument (including, in some examples, at least one municipal instrument). In some examples, the data in data table(s) 304 may change as the underlying data changes and as new securities (e.g., municipal securities) are issued. In some examples, when a new municipal security is issued, server(s) 102 may link this data to existing geo-spatial data at the issuer, issue and/or obligor level. In some examples, the new data may be flagged for review (e.g., for review by a data operations team). Once the linkage to the credit risk indicator(s) occurs, the data may be automatically linked to a (e.g., municipal) security.

In some examples, geo mapping generator 120 may be configured to provide instrument-level information with respect to geoID (where the geoID is associated with a particular geo-spatial area). Table 6 provides an example association between instrument and geoID. In some examples, geo mapping generator 120 may be configured to provide various information (e.g., temporal information, credit risk information (referred in as "Insights", etc.) as a function of geoID. Table 7 provides an example of information that may be available as a function of geoID In Table 7, the column "Current" relates to a metric value for a particular insight for a particular geoID. In the column "Geo Level", "Specific_A" represents a city-level geo-spatial area, "Specific_B" represents a zip code including the specific city-level area and "Specific_C" represents a state in which the zip code resides. In general, a user may be able to query server(s) 102 for information according to, without being limited to, security data, instrument data, credit risk indicator data, geo-spatial area(s), geoID, etc.

TABLE 6

Example association between instrument and geoID.

| Instrument ID | geoID |
| --- | --- |
| 240415DT | 2146277 |
| 033162FG8 | 2160432 |
| 004603AK2 | 192552884 |
| 01243TAA9 | 2171979 |

TABLE 7

Example of information associated with geoID.

| geoID | Date | Insights | Geo Level | Current |
| --- | --- | --- | --- | --- |
| 123456789 | Mar. 1, 2021 | Employee Count | Specific_A | 1000 |
| 123456789 | Mar. 1, 2021 | Score1 | Specific_A | 99 |
| 123456789 | Mar. 1, 2021 | Score1 | Specific_B | 98 |
| 123456789 | Mar. 1, 2021 | Score1 | Specific_C | 97 |

Components of geo mapping server(s) 102 of the present disclosure may be embodied on a single computing device. In other examples, components of the geo mapping server(s) 102 may be embodied on two or more computing devices distributed over several physical locations, connected by one or more wired and/or wireless links. It should be understood that system 100 of the present disclosure refers to a computing system having sufficient processing and memory capabilities to perform the specialized functions described herein.

Some portions of the present disclosure describe embodiments in terms of algorithms and/or routines and symbolic representations of operations on information. These algorithmic descriptions and representations are used to convey the substance of this disclosure effectively to others skilled in the art. These operations, while described functionally, computationally, or logically, are to be understood as being implemented by data structures, computer programs or equivalent electrical circuits, microcode, or the like. Furthermore, at times, it may be convenient to refer to these arrangements of operations as routines or algorithms. The described operations and their routines/algorithms may be embodied in specialized software, firmware, specially-configured hardware or any combinations thereof.

The methods described herein (that may be conducted by geo mapping and dissemination system 100 of the present disclosure) may be performed by processing logic that may comprise hardware (e.g., circuitry, dedicated logic, programmable logic, microcode, etc.), software (such as instructions run on a processing device), or a combination thereof. In one embodiment, the methods described herein may be performed by one or more specialized processing components.

Figure 4A:
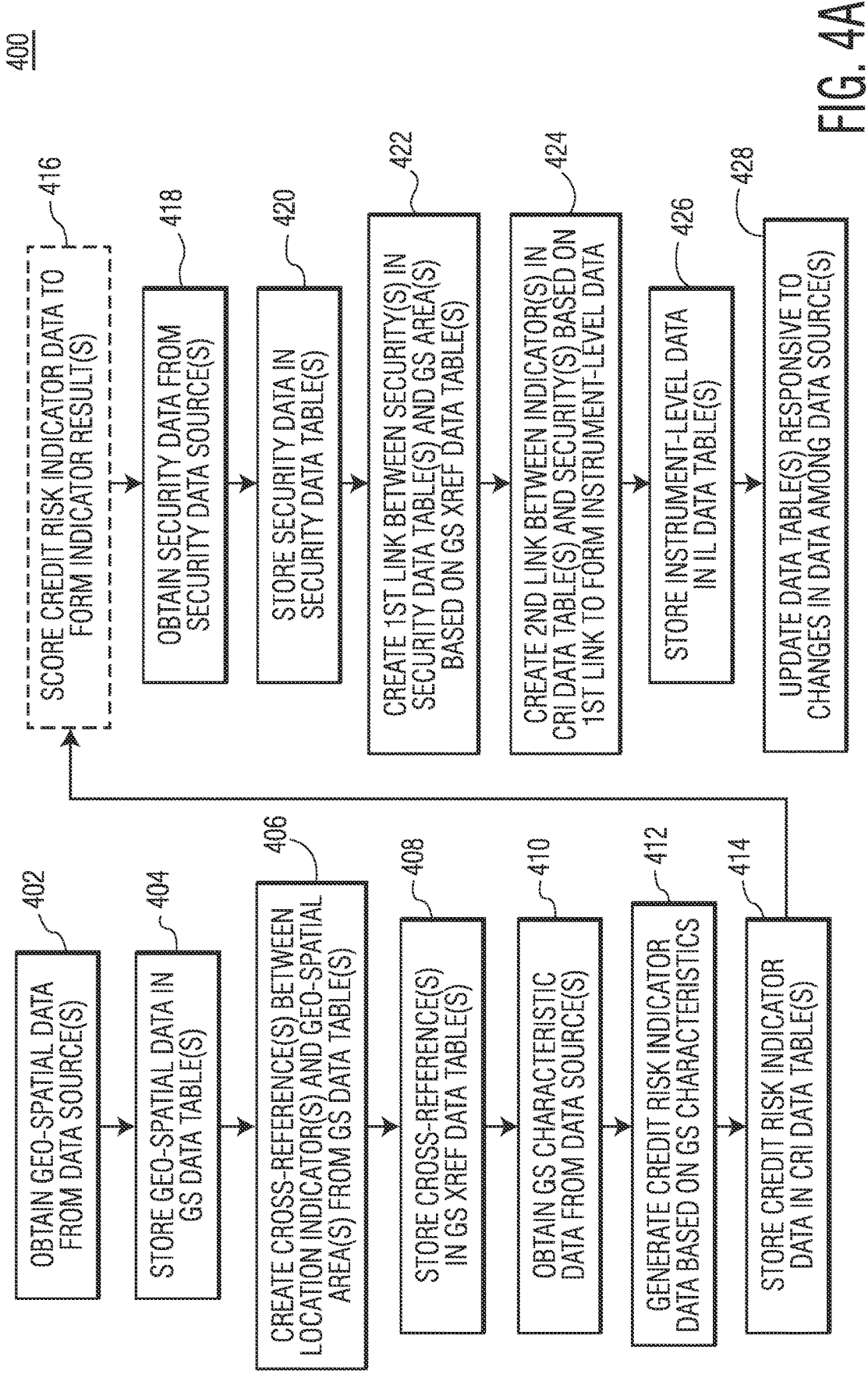
FIG. 4A is a flowchart diagram of an example method for mapping locations to geo-spatial areas and linking geo-spatial areas to instrument-level credit risk information, according to an aspect of the present disclosure.
Figure 4B:
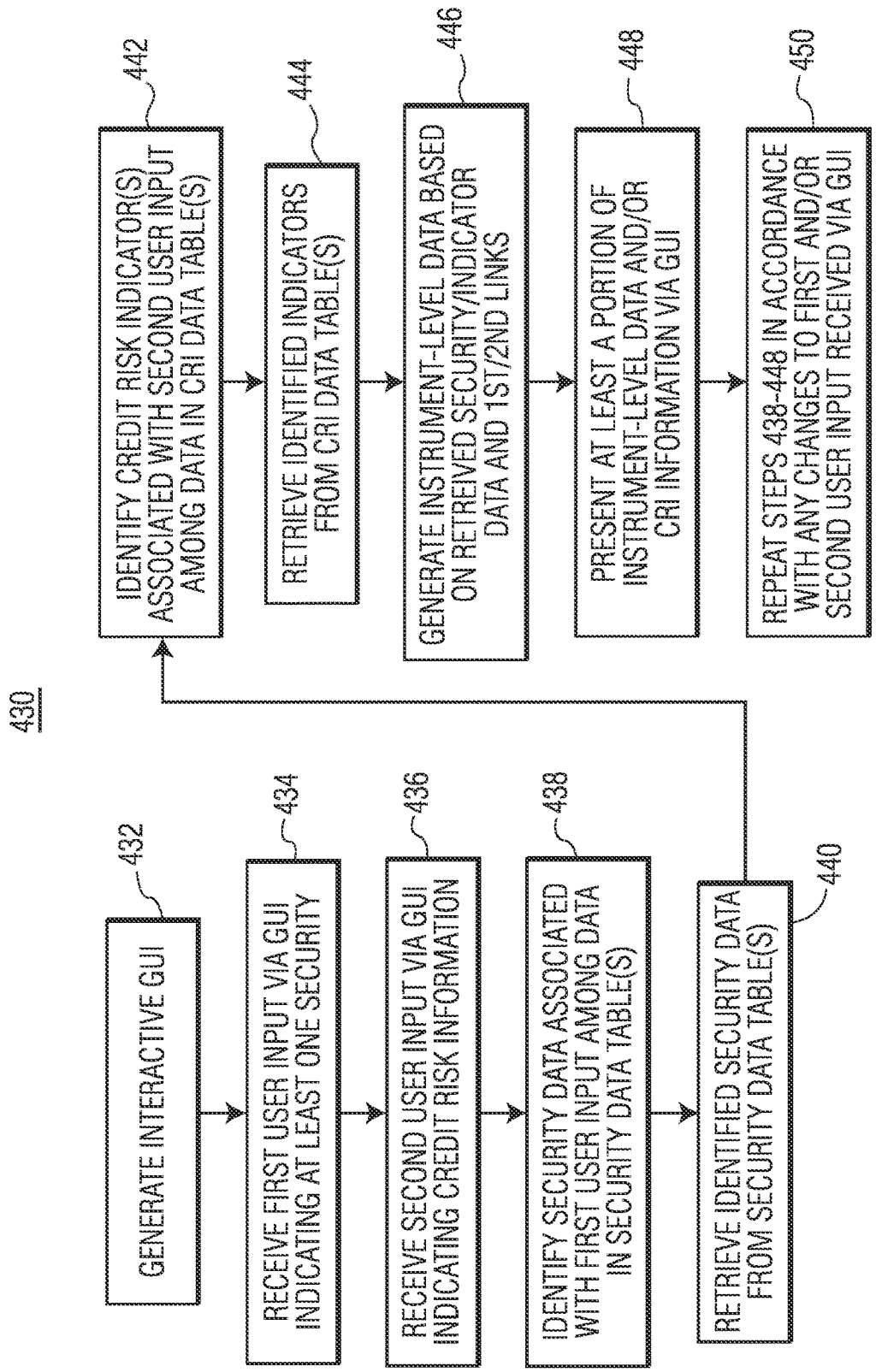
FIG. 4B is a flowchart diagram of an example method for converting security data to instrument-level credit risk information based on geographical mapping, according to an aspect of the present disclosure.

Server(s) 102 may be configured with more or less components to conduct the methods described herein with reference to FIGS. 4A and 4B. In particular, FIG. 4A is a flowchart diagram illustrating an example method for mapping locations to geo-spatial areas and linking geo-spatial areas to instrument-level credit risk information; and FIG. 4B is a flowchart diagram an example method for converting security data to instrument-level credit risk information based on geographical mapping. As illustrated in FIGS. 4A and 4B, the methods shown may be performed by processing logic that may comprise hardware (e.g., circuitry, dedicated logic, programmable logic, microcode, etc.), software (such as instructions run on a processing device), or a combination thereof. In one embodiment, the methods shown in FIGS. 4A and 4B may be performed by one or more specialized processing components associated with components 116-124 of system 100 of FIG. 1 (as well as components of FIGS. 2 and/or 3). It is understood that methods shown in FIGS. 4A and 4B represent non-limiting examples of geo mapping to create one or more geo-spatial links between one or more securities and other information (e.g., credit risk indicator(s)) that may be sourced and indexed by location. The methods may also be implemented to handle any other type of electronic data anticipated by the present disclosure.

Figure 7:
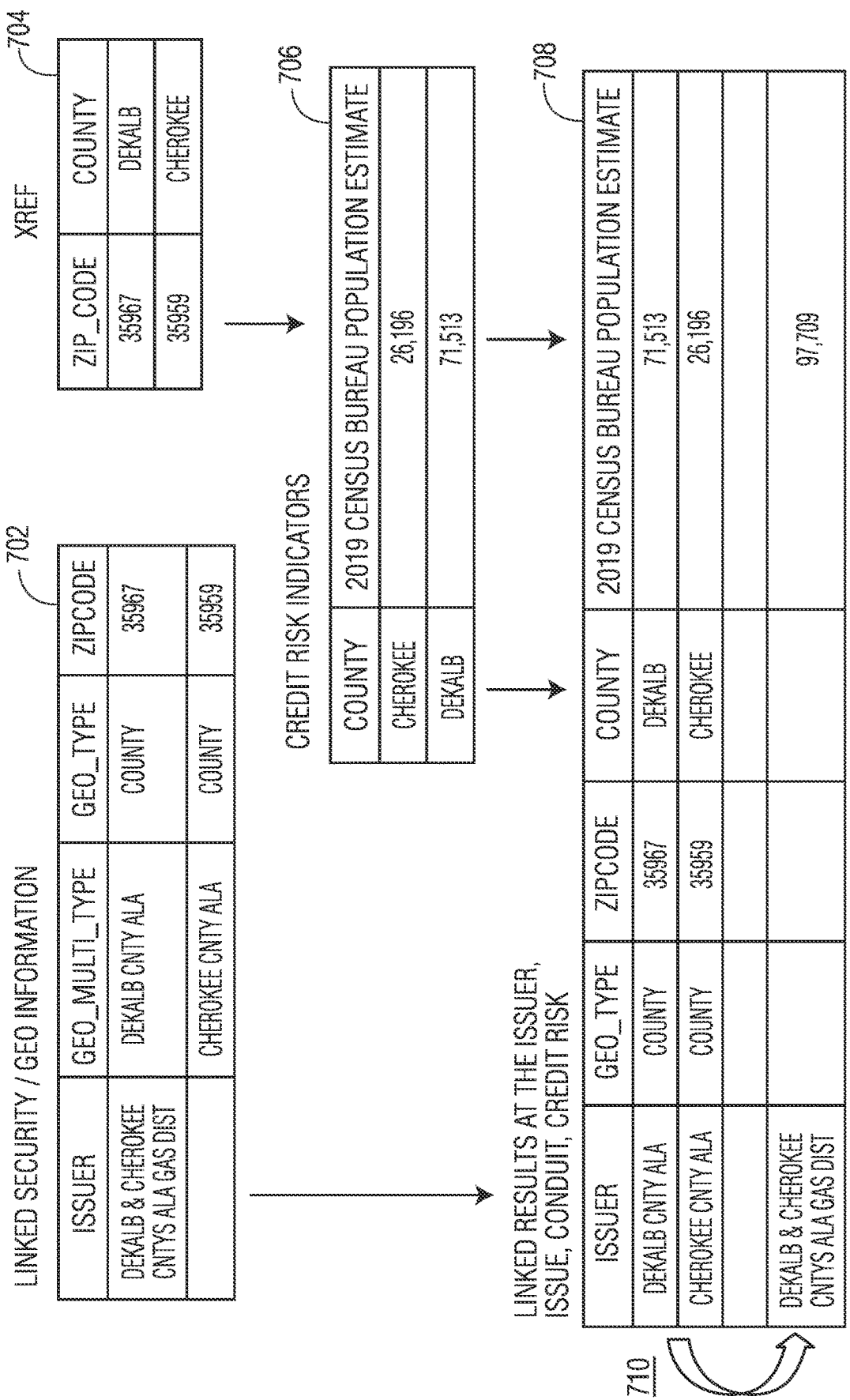
FIG. 7 is a diagram illustrating example data tables and linking of information among the data tables to generate municipal bond information linked to credit risk information, according to an aspect of the present disclosure.

FIGS. 4A and 4B are also described with respect to FIG. 7. FIG. 7 is a diagram illustrating example data tables and linking of information among data tables 702-708 to generate municipal bond information linked to credit risk information, according to an aspect of the present disclosure.

FIG. 4A is a flowchart diagram of example method 400 for mapping locations to geo-spatial areas and linking geo-spatial areas to instrument-level credit risk information, according to an aspect of the present disclosure. At step 402, data aggregator 116 of server(s) 102 may obtain geo-spatial data from among geo-spatial data sources 110. At step 404, data aggregator 116 may store the obtained geo-spatial data in geo-spatial (GS) data table(s) 214. Data table(s) 214 may be stored in data structure(s) 118.

At step 406, data aggregator 116 may create one or more cross-references between one or more location indicators (e.g., zip codes) and one or more geo-spatial areas, based on the geo-spatial data of data table(s) 214. In some examples, the creation of cross-reference(s) may include defining cross-reference(s) between different geo-spatial areas. In some examples, a statistical analysis may be performed (e.g., via one or more statistical algorithms) to determine a best relationship between a zip code and another geo-spatial area. At step 408, data aggregator may store the cross-reference(s) in one or more geo-spatial cross-reference (GS XREF) data table(s) 220. Data table(s) 214 may be stored in data structure(s) 118.

At step 410, data aggregator 116 may obtain geo-spatial characteristic data from among geo-spatial characteristic data source(s) 112. At step 412, data aggregator 116 may generate one or more possible credit risk indicators based on the obtained geo-spatial characteristic data (step 410). In some examples, the credit risk indicator(s) may be defined at one or more geo-spatial areas, such as at the zip code, city, county, state and/or MSA level. At step 414, data aggregator 116 may store the credit risk indicator data in one or more credit risk indicator (CRI) data tables 216. Data table(s) 216 may be stored in data structure(s) 118. At optional step 416, data aggregator 116 may score and/or rank the credit risk indicator data to form (scored and/or ranked) indicator results.

At step 418, data aggregator 116 may obtain security data for one or more securities from among security data source(s) 114. At step 420, data aggregator 116 may store the security data in one or more security data tables 218. Data table(s) 218 may be stored in data structure(s) 118.

At step 422, geo mapping generator 120 may create a first link between one or more securities in security data table(s) 218 and one or more geo-spatial areas based on the geo-spatial cross reference data in data table(s) 220. In some examples, the first link may be determined either directly or indirectly. In some examples, municipal securities may utilize the structure of the security by linking the structure at the issuer, issue and/or obligor level. FIG. 7 illustrates example table 702 illustrating first link between a municipal security (at the issuer level) and two geo-spatial areas (and corresponding zip codes representing location indicators).

At step 424, geo mapping generator 120 may create a second link between one or more credit risk indicators in data table(s) 216 and one or more securities, based on the first link. The second link may be used to form instrument-level data for one or more securities. For example, geo mapping generator 120 may utilize the geo-spatial cross reference data and credit risk indicator data at one or more geo-spatial levels to link the credit risk indicator data to at least one security using its defined geo-spatial information (e.g., data at the instrument level). For example, as shown in FIG. 7, cross-reference data in table 704 between zip code and county (where the zip code is indicated in the first link shown in table 702) may be used retrieve related credit risk indicators, as shown in table 706. Data in the first link (table 702) may be combined with data in the identified credit risk indicators (table 706) to form the second link (table 708). Table 708 (the second link) includes security results at the issuer level, issue level, any conduits and an associated credit risk and conduit 710. Arrow 710 indicates that separate issuers (De Kalb County and Cherokee County) form a combined issuer (De Kalb & Cherokee Counties). In general, data in the second link (e.g., table 708) may be used to form one or more instrument-level data tables (e.g., FIG. 9). At step 426, geo mapping generator 120 may store the instrument-level data in one or more instrument-level data tables 304. Data table(s) 304 may be stored in data structure(s) 118.

At step 428, data aggregator 116 may monitor data from among data source(s) 104 (e.g., data source(s) 110-114) and may update one or more of data tables 214-220 and 304 responsive to any changes among data source(s) 428. Although not shown in FIG. 4A, data such as instrument-level data, credit risk indicator(s), indicator result(s), data among other data tables 214-220 may be output to dissemination entity(s) 106, for example via data distributer 122 and/or data interface 124.

Although the disclosure herein illustrates examples of types of data that may be associated with a spatial area and that may be accessed and indexed by location, it is understood that the examples provided are non-limiting. As discussed above, geo mapping systems of the present disclosure may include the use of any suitable data that may be associated with a spatial area and may provide an indication of credit risk.

FIG. 4B is a flowchart diagram of example method 430 for converting security data to instrument-level credit risk information based on geographical mapping, according to an aspect of the present disclosure. At step 432, data interface 124 may generate interactive GUI(s) 126. For example, interactive GUI(s) 126 may be presented on a display of at least one dissemination entity(s) 106, such as a client device. As discussed above, interactive GUI(s) 126 may include one or more tools for user selection, querying and interactive presentation.

At step 434, data interface 124 may receive first user input via interactive GUI(s) 126 (e.g., via user input tool(s)) indicating a selection of at least one security. At step 436, data interface 124 may receive second user input via interactive GUI(s) 126 indicating a selection of desired credit risk information.

At step 438, geo mapping generator 120 may identify security data associated with the first user input (step 434) among data table(s) 218. At step 440, geo mapping generator 120 may retrieve the identified security data from data table(s) 218. At step 442, geo mapping generator 120 may identify one or more credit risk indicators associated with the second user input (step 436) among data in data table(s) 216. At step 444, geo mapping generator 120 may retrieve the identified credit risk indicator(s) from data table(s) 216.

At step 446, geo mapping generator 120 may generate instrument-level data (as well as credit risk indicator information) based on the retrieved security and credit risk indicator data (steps 440 and 444) as well as the respective first and second links determined between security(s) data/GS area(s) and indicator(s)/security(s) (steps 422 and 424 in FIG. 4A). At step 448, interactive GUI(s) 126 may present (e.g., via interactive presentation tool(s)) at least a portion of instrument-level data and/or credit risk indicator information (e.g., credit risk indicator(s), scaled and/or ranked indicator results, etc.), as well as (in some examples) any other suitable information. At step 450, server(s) 102 may repeat steps 438-448 in accordance with any changes to the first and/or second user input received via interactive GUI(s) 126.

Figure 10B:
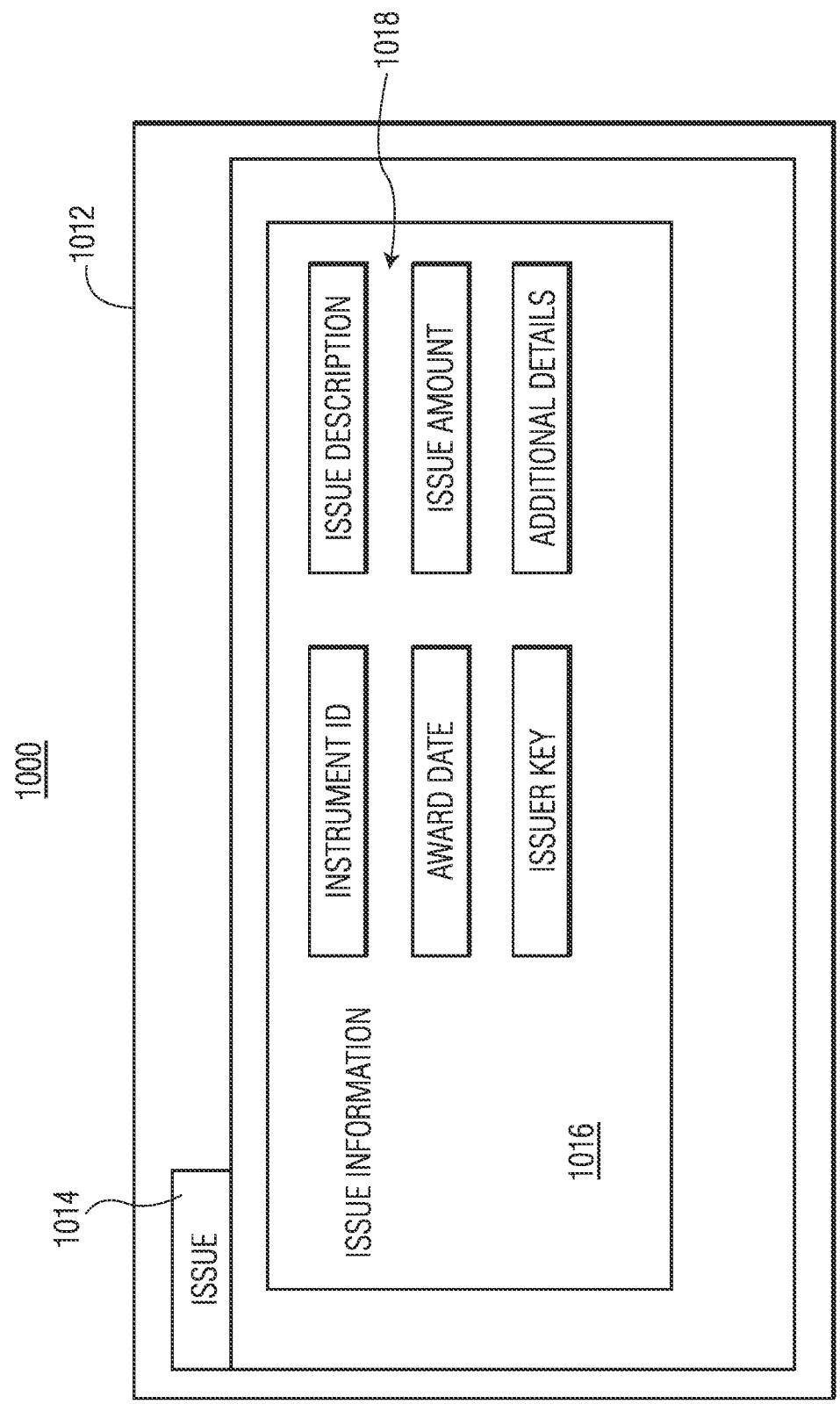

Referring next to FIGS. 10A-10G, examples of interactive GUIs for users that may be part of server(s) 102 (FIG. 1) are described, according to aspects of the present disclosure. More particularly, FIGS. 10A-10G are screenshots of example security geo mapping interactive GUI 1000 (referred to herein as GUI 1000). FIGS. 10A-10F represent examples of interactive GUI(s) 124 (FIG. 1) that may be used by administrator(s) 128 for aiding in the collection of geo-spatial information associated with securities such as munis. FIG. 10G represents an example of interactive GUI 124 that may be used by dissemination entity(s) 106 for obtaining instrument-level data for one or more securities. Although exemplary sections/windows are depicted in FIGS. 10A-10G, alternative configurations for the sections/windows are envisioned. For example, GUI 1000 may include more or fewer sections, windows, webpages and/or tabs. Additionally, the sections/windows may be reorganized and displayed to optimize GUI space and efficient utilization of pertinent information.

FIG. 10A illustrates maturity information window 1002 (referred to herein as window 1002) of GUI 1000. GUI 1000 may include header 1004, user-selection region 1006 having one or more selectable tabs and one or more windows, including window 1002. Window 1002 may be displayed when maturity tab 1008 of user-selection region 1006 is selected for a particular issuer key (previously selected). As shown in FIG. 10A, the issuer key ("Issue") may be displayed in header 1004. Window 1002 may include display region 1010 for presenting various issue data of one or more instruments (identified by instrument ID). The instruments shown in window 1002 are linked to a same issue key (indicated in header 1004). The issue key may identify a bond offering on an issue level.

FIG. 10B illustrates issue window 1012 (referred to herein as window 1012) of GUI 1000. Window 1012 may be displayed when issue tab 1014 selected on user-selection region 1006 (FIG. 10A). Window 1012 may include display region 1016. Display region may present various issue data 1018 for a particular instrument (indicated by instrument ID). For example, information 1018 may include an award, date, issue description information, an issue amount, one or more additional details and the associated issuer key (which may link issue data to one more issuers).

FIG. 10C illustrates issuer window 1020 (referred to herein as window 1020) of GUI 1000. Window 1020 may be displayed when issuer tab 1024 of user-selection region 1022 is selected. Window 1020 may include user input region 1026 for querying information regarding an instrument ID, an issuer key and/or an issuer name. FIG. 10C illustrates pop-up window 1030 that may be presented when example issuer key input 1028 is entered in user input region 1026. Pop-up window 1030 may include display region 1032 and user selection region 1034. Display region 1032 may present an indication of instruments (indicated by instrument ID) linked to issue key input 1028. User selection region 1034 may include one or more buttons for closing pop-up window 1030.

Figure 10D:
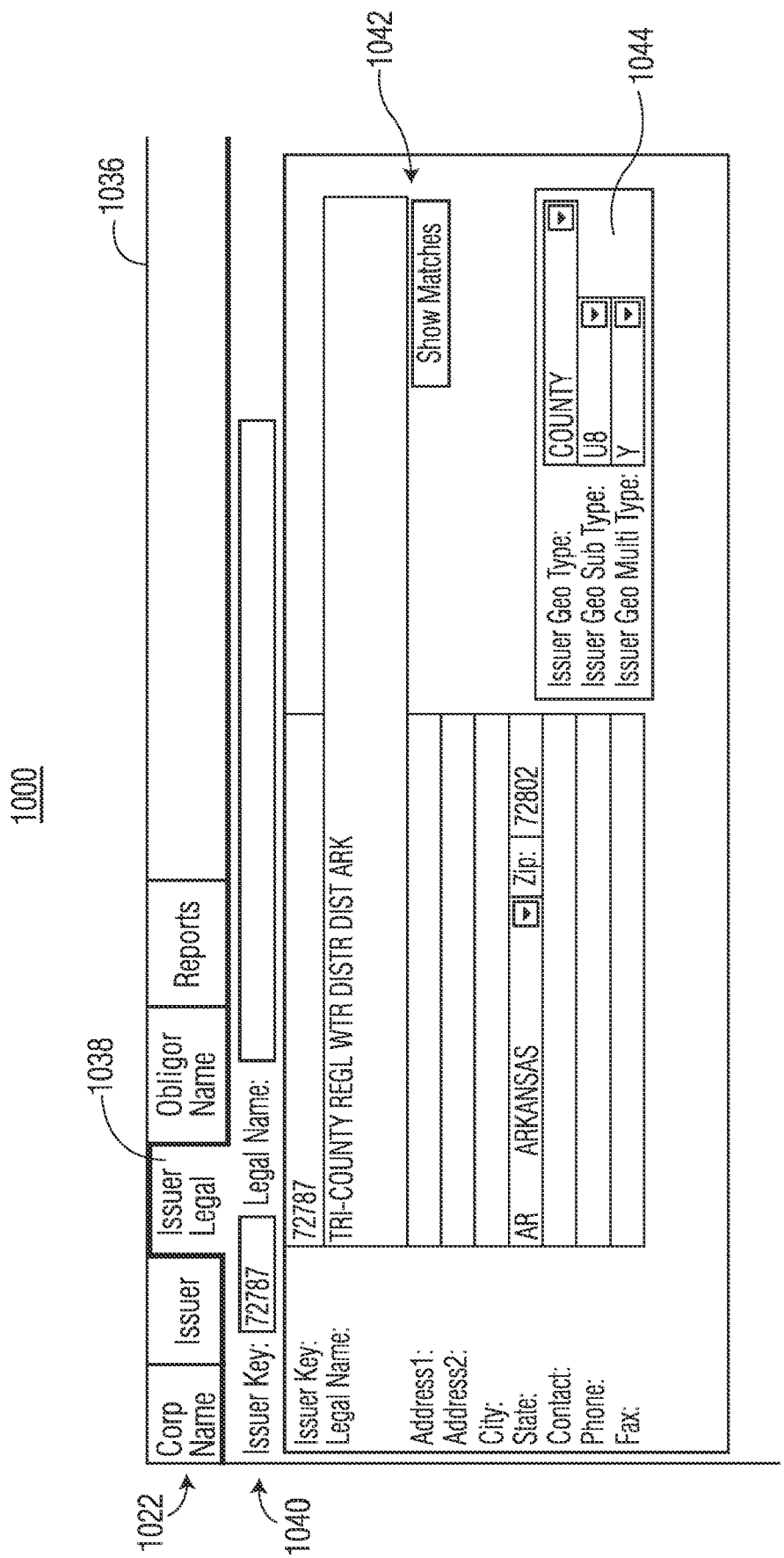

FIG. 10D illustrates issuer legal window 1036 (referred to herein as window 1036) of GUI 1000. Window 1036 may be displayed when issuer legal tab 1038 of user-selection region 1022 is selected. Window 1036 may include user input region 1040 for querying information regarding an issuer key and/or a legal name. Window 1036 may include display region 1042 and geo-spatial information region 1044. Display region 1042 may present issuer-level information, such as an issuer key, a legal name, location and contact information (as available) depending on user input in user input region 1040. Geo-spatial information region 1044 may provide geo-spatial information at the issuer-level determined by server(s) 102, such as "Issuer Geo Type", "Issuer Geo Sub Type" and "Issuer Geo Multi Type." In some examples, when "Issuer Geo Multi Type" is "yes", additional information may be presented in window 1036. In some examples, window 1036 may be used to associate an issuer with a geo location (shown in geo-spatial information region 1044).

FIG. 10E illustrates conduit obligor window 1046 (referred to herein as window 1046) of GUI 1000. Window 1046 may be displayed when corporation (corp) name tab 1048 of user-selection region 1022 is selected. Window 1046 may include user input region 1050 for querying information regarding a corporation key, an identifier and/or a corporation name. Window 1046 may include display region 1052 and geo-spatial information region 1054. Display region 1052 may present conduit obligor-level information, such as a corporation key, an identifier, a corporation name, location and contact information (as available) depending on user input in user input region 1050. Geo-spatial information region 1054 may provide geo-spatial information at the conduit obligor (corporation)-level determined by server(s) 102, such as "Corp Geo Type", "Corp Geo Sub Type" and "Corp Geo Multi Type." In some examples, when "Corp Geo Multi Type" is "yes", additional information may be presented in window 1046. In window 1046, information on the conduit obligor level may be linked by the corporation key.

FIG. 10F illustrates obligor window 1056 (referred to herein as window 1056) of GUI 1000. Window 1056 may be displayed when obligor name tab 1058 of user-selection region 1022 is selected. Window 1056 may include user input region 1060 for querying information regarding an obligor key, an identifier and/or an obligor name. Window 1056 may include display region 1062 and geo-spatial information region 1064. Display region 1062 may present obligor-level information, such as an obligor key, an identifier, an obligor name, location and contact information (as available) depending on user input in user input region 1060. Geo-spatial information region 1064 may provide geo-spatial information at the obligor-level determined by server(s) 102, such as "Obligor Geo Type", "Obligor Geo Sub Type" and "Obligor Geo Multi Type." In some examples, when "Obligor Geo Multi Type" is "yes", additional information may be presented in window 1056. In window 1056, information on the obligor level may be linked by the obligor key.

FIG. 10G illustrates user interaction window 1070 (referred to herein as window 1070) of GUI 1000. In some examples, window 1070 may be utilized by dissemination entity(s) 106 (FIG. 1) for searching for information in data structure(s) 118 (FIG. 1) and/or obtaining instrument-level data and/or credit risk indicator(s) for a user-selected security. Window 1070 may include one or more user input region(s) 1072 for providing user input indicating at least one security and desired credit risk information (e.g., population), as well as any other suitable user input, for obtaining instrument-level data and/or credit risk information for a user-selected security of interest. Window 1070 may also include interactive database search tool 1074, for searching for information associated with one or more of securities, credit risk indicators, geo-spatial information and instruments stored in data structure(s) 118. Window 1070 may also include one or more interactive display regions 1078. Display region(s) 1078 may include instrument-level data and/or CRI information region 1080. Region 1080 may include one or more interactive presentation tools for viewing instrument-level data and/or credit risk indicator(s) for one or more (geo mapped) securities of interest (e.g. based on user input in user input region(s) 1072). In some examples, display region(s) 1078 may also include an interactive display of results of database search tool 1074. In some examples, display region(s) 1078 may include interactive additional details region 1082. Region 1082 may provide any suitable additional details regarding securities, credit risk indicators and/or instruments associated with region 1080 (and/or database search tool 1074) that may be useful for analyzing the displayed results (e.g., award date, issue description, issue amount, maturity date, maturity amount, original price, etc.). Window 1070 may also include one or more user-selectable data download options 1076 for downloading data displayed in display region(s) 1078. For example, download option(s) 1076 may include options for downloading displayed data in a printable format, in a spreadsheet format, and the like.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic information/transaction system, such as any device capable of receiving, transmitting, processing and/or using data and information. The computer may comprise a server, a processor, a microprocessor, a personal computer (PC), such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

FIG. 11 illustrates a functional block diagram of a machine in the example form of computer system 1100 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more of components 116-124 of geo mapping server(s) 102, data source(s) 104 and/or dissemination entity(s) 106 may be implemented by a specialized machine, particularly programmed to perform certain functions, such as the example machine shown in FIG. 11 (or a combination of two or more of such machines).

Example computer system 1100 may include processing device 1102, memory 1106, data storage device 1110 and communication interface 1112, which may communicate with each other via data and control bus 1118. In some examples, computer system 1100 may also include display device 1114 and/or user interface 1116.

Processing device 1102 may include, without being limited to, a microprocessor, a central processing unit, an application-specific integrated circuit (ASIC), a field programmable gate array (FPGA), a digital signal processor (DSP) and/or a network processor. Processing device 1102 may be configured to execute processing logic 1104 for performing the operations described herein. Processing device 1102 may include a special-purpose processing device specially programmed with processing logic 1104 to perform the operations described herein.

Memory 1106 may include, for example, without being limited to, at least one of a read-only memory (ROM), a random access memory (RAM), a flash memory, a dynamic RAM (DRAM) and a static RAM (SRAM), storing computer-readable instructions 1108 executable by processing device 1102. Memory 1106 may include a non-transitory computer readable storage medium storing computer-readable instructions 1108 executable by processing device 1102 for performing the operations described herein. For example, computer-readable instructions 1108 may include operations performed by components 116-124 of geo mapping server(s) 102 (FIG. 1), components 202-212 (FIG. 2) and/or component 302 (FIG. 3), including operations shown in FIGS. 4A and 4B. Although one memory device 1106 is illustrated in FIG. 11, in some examples, computer system 1100 may include two or more memory devices (e.g., dynamic memory and static memory).

Computer system 1100 may include communication interface device 1112, for direct communication with other computers (including wired and/or wireless communication) and/or for communication with a network. In some examples, computer system 1100 may include display device 1114 (e.g., a liquid crystal display (LCD), a touch sensitive display, etc.). In some examples, computer system 1100 may include user interface 1116 (e.g., an alphanumeric input device, a cursor control device, etc.).

In some examples, computer system 1100 may include data storage device 1110 storing instructions (e.g., software) for performing any one or more of the functions described herein. Data storage device 1110 may include a non-transitory computer-readable storage medium, including, without being limited to, solid-state memories, optical media and magnetic media.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system for geographical mapping and linking of disparate data structures for interaction, the system comprising:
one or more data source systems configured to generate geospatial data, security data and other data; and
at east one server in communication with the one or more data source systems, the at east one server configured to:
continually monitor data among the one or more data source systems in at least one of real-time or near real-time;
obtain and store in at least one database the geo-spatial data, the security data, and the other data, from among the one or more data source systems responsive to the monitoring;
create, in the at least one database, filtered data tables including at least one first data table, at least one second data table, and at least one third data table;
convert, using a data integrator tool, at least a portion of the data among the geo-spatial data, the security data, and the other data from at least one non-standardized format into a common format, prior to entry and storing within the filtered data tables;
create one or more cross-references between one or more zip codes and one or more geo-spatial areas based on at least one statistical algorithm, in accordance with the geo-spatial data among the one or more data source systems, wherein the at least one statistical algorithm is configured to query the geo-spatial data and map the one or more zip codes to the one or more geo-spatial areas based on a maximum area of intersection between the one or more zip codes in accordance with at least one predetermined criteria that includes one or more of a coverage area and a population density;
store the created cross-references in the at least one first data table;
generate, for each of the one or more geo-spatial areas, at least one credit risk indicator based on the other data among the one or more data source systems, to form credit risk indicator data;
store the credit risk indicator data in the at least one second data table;
identify at least one municipal security of the security data among the one or more data source systems, the at least one municipal security associated with at least one among the one or more zip codes;
create a first link between the at least one municipal security and at least one among the one or more geo-spatial areas based on the created cross-references in the at least one first data table;
create a second link between the at least one credit risk indicator among the credit risk indicator data in the at least one second data table and the at least one municipal security based on the first link, to form instrument-level data for the at least one municipal security including the at least one credit risk indicator;
store the instrument-level data for the at least one municipal security in the at least one third data table;
in response to changes in the monitored data at least one of: update one or more xi in data vies stared among the filtered data tables and add one or more new data entries among the filtered data tables;
generate an interactive graphical user interface (GUI) comprising one or more interactive webpages; and
query, via the one or more interactive webpages, the filtered data tables including any updated data entries and any added data entries.

2. The system of claim 1, wherein the at least one server is further configured to disseminate at least one of the instrument-level data and the credit risk indicator data to at least one dissemination entity.

3. The system of claim 2, wherein the at least one dissemination entity comprises at least one of a client device; an external distribution system, a delivery platform and an external database.

4. The system of claim 1, Wherein the geo-spatial data comprises one or more of demographic data, economic data, social data and healthcare data.

5. The system of claim 1, wherein the other data is associated with at least one of the one or more geo-spatial areas, the other data comprising one or more of population data, income data, migration data, labor data, housing data, education data and healthcare data.

6. The system of claim 1, wherein the one or more geo-spatial areas comprise one or more of at least one city, at least one subdivision, at least one county, at least one state, a multi-state area, a metropolitan statistical area, a micropolitan statistical area and a core base statistical area.

7. The system of claim 1, wherein the at least one server is further configured to determine at least one of a score and a ranking of the at least one credit risk indicator based on at least one predetermined attribute of the other data.

8. The system of claim 1, wherein the at least one server is further configured to store the obtained geo-spatial data, the security data and the other data in one or more data tables associated with the at least one database.

9. The system of claim 1, wherein the at least one server is further configured to store a portion of at least one of the at least one first data table, the at least one second data table and the at least one third data table in at least one in-memory cache.

10. The system of claim 1, wherein the one or more interactive webpages of the interactive GUI further comprises one or more user tools, the at least one server configured to receive user input via the one or more user tools, the user input associated with at least one of querying the at least one third data table and creating user-customized instrument-level data.

11. A method for geographical mapping and linking of disparate data structures for interaction the method comprising:
- continually monitoring, via at least one server in communication with one or more data source systems, data among the one or more data source systems in at least one of real-time or near real-time;
- obtaining and storing in at least one database, via the at least one server, geo-spatial data, security data and other data from among the one or more data source systems responsive to the monitoring;
- creating, in the at least one database, filtered data tables including at least one first data table, at least one second data table, and at least one third data table;
- converting, using a data integrator tool associated with the at least one server, at least a portion of the data among the geo-spatial data, the security data, and the other data from at least one non-standardized Format into a common format, prior to entry and storing within the filtered data tables;
- creating, by the at least one server, one or more cross-references between one or more zip codes and one or more geo-spatial areas based on at least one statistical algorithm; in accordance with the geo-spatial data among the one or more data source systems, wherein the at least one statistical algorithm is configured query the geo-spatial data and to map the one or more zip codes to the one or more geo-spatial areas based on a maximum area of intersection between the one or more zip codes in accordance with at least one predetermined criteria that includes one or more of a coverage area and a population density;
- storing the created cross-references in the at least one first data table;
- generating, by the at least one server, for each of the one or more geo-spatial areas, at least one credit risk indicator based on the other data among the one or more data source systems, to form credit risk indicator data;
- storing the credit risk indicator data in the at least one second data table;
- identifying, by the at least one server, at least one municipal security of the security data among the one or more data source systems, the at least one municipal security associated with at least one among the one or more zip codes;
- creating, by the at least one server, a first link between the at least one municipal security and at least one among the one or more geo-spatial areas based on the created cross-references in the at least one first data table;
- creating, by the at least one server, a second link between the at least one credit risk indicator among the credit risk indicator data in the at least one second data table and the at least one municipal security based on the first link, to form instrument-level data for the at least one municipal security including the at least one credit risk indicator;
- storing the instrument-level data for the at least one municipal security in the at least one third data table;
- in response to changes in the monitored data at least one of: updating one or more existing data entries stored among the filtered data tables and adding one or more new data entries among the filtered data tables;
- generating an interactive graphical user interface (GUI) comprising one or more interactive webpages; and
- querying, via the one or more interactive webpages, the filtered data tables including any updated data entries and an added data entries.

12. The method of claim 11, the method further comprising:
- disseminating, by the at least one server, at least one of the instrument-level data and the credit risk indicator data to at least one dissemination entity.

13. The method of claim 12, wherein the at least one dissemination entity comprises at least one of a client device, an external distribution system, a delivery platform and an external database.

14. The method of claim 11, wherein the geo-spatial data comprises one or more of demographic data, economic data, social data and healthcare data.

15. The method of claim 11, wherein the other data is associated with at least one of the one or more geo-spatial areas, the other data comprising one or more of population data, income data, migration data, labor data, housing data, education data and healthcare data.

16. The method of claim 11, wherein the one or more geo-spatial areas comprise one or more of at least one city, at least one subdivision, at least one county, at least one state, a multi-state area, a metropolitan statistical area, a micropolitan statistical area and a core base statistical area.

17. The method of claim 11, the method further comprising:
- determining, by the at least one server, at least one of a score and a ranking of the at least one credit risk indicator based on at least one predetermined attribute of the other data.

18. The method of claim 11, the method further comprising:
- storing the obtained geo-spatial data, the security data and the other data in one or more data tables associated with the at least one database.

19. The method of claim 11, the method further comprising:
- storing a portion of at least one of the at least one first data table, the at least one second data table and the at least one third data table in at least one in-memory cache.

20. The method of claim 11, wherein the one or more interactive webpages of the interactive GUI further comprises one or more user tools, the method further comprising;
- receiving, by the at least one server, user input via the one or more user tools, the user input associated with at least one of querying the at least one third data table and creating user-customized instrument-level data, and
- updating the interactive GUI responsive to the user input.

* * * * *